US009065519B2

(12) United States Patent
Cyzs et al.

(10) Patent No.: US 9,065,519 B2
(45) Date of Patent: Jun. 23, 2015

(54) METHOD AND SYSTEM OF INTERFERENCE CANCELATION IN COLLOCATED TRANSCEIVERS CONFIGURATIONS

(75) Inventors: Baruch Cyzs, Kiryat-Motzkin (IL); Amir Meir, Tel-Aviv (IL); Oren Amidan, Tzur-Yigal (IL); Daniel Manor, Tel-Aviv (IL)

(73) Assignee: Ubiqam Ltd., Petach-Tikva (IL)

( * ) Notice: Subject to any disclaimer, the term of this patent is extended or adjusted under 35 U.S.C. 154(b) by 114 days.

(21) Appl. No.: 13/700,146

(22) PCT Filed: May 26, 2011

(86) PCT No.: PCT/IB2011/052308
§ 371 (c)(1),
(2), (4) Date: Nov. 27, 2012

(87) PCT Pub. No.: WO2011/148341
PCT Pub. Date: Dec. 1, 2011

(65) Prior Publication Data
US 2013/0102254 A1    Apr. 25, 2013

(30) Foreign Application Priority Data
May 27, 2010    (IL) .......................................... 206008

(51) Int. Cl.
| H04B 1/00 | (2006.01) |
| H04B 15/00 | (2006.01) |
| H04B 1/10 | (2006.01) |
| H04B 1/12 | (2006.01) |
| H04B 1/525 | (2015.01) |

(52) U.S. Cl.
CPC .................. *H04B 1/10* (2013.01); *H04B 1/126* (2013.01); *H04B 1/525* (2013.01)

(58) Field of Classification Search
CPC ......................................................... H04B 1/10
USPC ........................... 455/63.1, 63.13, 114.2, 570
See application file for complete search history.

(56) References Cited

U.S. PATENT DOCUMENTS 5,584,065 A * 12/1996 Monzello ...................... 455/296
6,446,008 B1 * 9/2002 Ozbek .............................. 702/17
(Continued)

FOREIGN PATENT DOCUMENTS

| WO | WO 2008/133443 | 11/2008 |
| WO | WO 2009/090400 | 7/2009 |
| WO | WO 2011/148341 | 12/2011 |

OTHER PUBLICATIONS

International Search Report and the Written Opinion Dated Oct. 7, 2011 From the International Searching Authority Re. Application No. PCT/IB2011/052308.
International Preliminary Report on Patentability Dated Dec. 6, 2012 From the International Bureau of WIPO Re. Application No. PCT/IB2011/052308.

(Continued)

*Primary Examiner* — Tuan H Nguyen

(57) ABSTRACT

The present invention, in some embodiments thereof, relates to a method of cancelling interference in a wireless system, wherein the interference introduced by an interfering signal causing reception of an interfered signal responsive to transmission of a desired signal, the method comprising acquiring the interfering signal from a transmitter during or before transmission thereof, generating an analog cancellation signal based on the acquired interfering signal, and injecting said analog cancellation signal into an interfered receiver receiving said interfered signal to reduce said interference therefrom.

22 Claims, 22 Drawing Sheets

(56) References Cited

U.S. PATENT DOCUMENTS

| | | | |
|---|---|---|---|
| 7,773,705 B2 * | 8/2010 | Jung et al. | 375/347 |
| 8,400,945 B2 * | 3/2013 | Barnes et al. | 370/256 |
| 2007/0190945 A1 | 8/2007 | Lee et al. | |
| 2007/0249350 A1 | 10/2007 | Jung et al. | |
| 2008/0232268 A1 | 9/2008 | Kahrizi et al. | |
| 2009/0050685 A1 | 2/2009 | Frederick et al. | |
| 2010/0022201 A1 | 1/2010 | Vandenameele | |
| 2010/0075595 A1 | 3/2010 | DeMarco et al. | |

OTHER PUBLICATIONS

Communication Pursuant to Article 94(3) EPC Dated Mar. 17, 2014 From the European Patent Office Re. Application No. 11735696.4.

Communication Pursuant to Article 94(3) EPC Dated Oct. 18, 2013 From the European Patent Office Re. Application No. 11735696.4.

Communication Pursuant to Article 94(3) EPC Dated Jan. 20, 2015 From the European Patent Office Re. Application No. 11735696.4.

Communication Pursuant to Article 94(3) EPC Dated Aug. 8, 2014 From the European Patent Office Re. Application No. 11735696.4.

* cited by examiner

METHOD AND SYSTEM OF INTERFERENCE CANCELATION IN COLLOCATED TRANSCEIVERS CONFIGURATIONS

RELATED APPLICATIONS

This application is a National Phase of PCT Patent Application No. PCT/IB2011/052308 having International filing date of May 26, 2011, which claims the benefit of priority of Israel Patent Application No. 206008 filed on May 27, 2010. The contents of the above applications are all incorporated herein by reference as if fully set forth in their entirety.

FIELD AND BACKGROUND OF THE INVENTION

The present invention, in some embodiments thereof, relates to a method and system of cancelling interferences in RF communication systems, such as, for example, self interferences occurring in collocated transceivers configurations and antennas pattern partial overlap interferences (also referred to herein as cross lobe interferences).

For example, wireless networks relay base-stations (BSs) are often used to connect remote subscriber-stations (SSs) to the wireless network over a wireless backhaul link that is typically operating within the same frequency band or frequency block used by the relay BS to communicate with the SSs. The backhaul communication is carried out between the relay BS and another BS (typically a wired BS of a larger size) or a backhaul feeder system. Such relay BS with in-band backhaul link is also referred to herein as SBBS (Self Backhaul Base Station), which is a BS, or access point, that provides access to SSs and further maintains a backhaul link within the same spectral band or block.

The feeder BS, or backhaul feeder, which provides the backhaul payload to the SBBS, will be referred to hereinafter as MaBS (Macro Base Station), which may be a part of a wireless access network supporting communication to both backhaul (to SBBSs) and to SSs. Alternatively, the MaBS may be a backhaul feeding unit supporting only backhaul communication to SBBSs. The SBBS typically comprises a Micro BS (MiBS) transceiver used to communicate between the SBBS and SSs, and a Backhaul Subscriber Station (BHSS) transceiver used for communicating between the SBBS and the MaBS.

In many cases the antennas of the MiBS and the BHSS transceivers are adjacently located (e.g., distances of about 0.05 to 2 meters in cases of single enclosure or compact installation site). Under any network duplexing regime, time-division duplexing (TDD) or frequency-division duplexing (FDD), the BHSS transceiver of the SBSS may transmit communication signals concurrently (i.e., at the same time and using the same frequency band) during time periods in which the MiBS transceiver is in receive mode, tuned to the same (or neighboring) frequency of the transmitter, and vice versa. This situation causes major difficulties, as the antennas of the MiBS and BHSS are located in close proximity, where one antenna is transmitting and the other antenna is receiving, and both transceivers use the same (or close) frequency band in the same frequency block. As a result, interferences are typically introduced in signals received in antennas of both BHSS and MiBS receivers, which hamper the quality of service (QoS) and the extent of potential capacity of both the backhaul and access links.

It is noted that such interferences also occur when the collocated transceivers are not using the same frequency channel, but are still using the same spectrum block (or band). Usually transmitters and receivers that can be tuned to any frequency channel within the spectrum block are not equipped with screening filters in their front RF stages, as the actual filtering is typically performed further in the RF chain. Thus, the strong interfering signal in the same spectrum block will hamper the communication link, which may cause saturation in the receiver's front RF stages that cannot be corrected later in the digital baseband signal processing. Such strong interferences may enforce lower gain of the low noise amplifier (LNA) attempting to avoid saturation in the receiver front end circuit, which may hamper the whole link performances of both collocated transceivers.

Interference may be also caused by transmitter deficiencies that may result in out-of-band, or in-band, output noise. This out-of-band, or in-band, transmitter noise may be so strong within the receiver's band such that it may hamper the desired signals.

Interference in reception of a desired signal may also occur when the receiving antennas of the desired signal and of the transmitting antenna of the interfering signal are not collocated i.e., when the desired signal receiving antenna is remotely located relative to location of interfering signal transmitting antenna. For example, interference in reception of a remotely located desired signal receiving antenna may occur in the following cases:

A. When there is collocation and overlap between the desired signal transmitting antenna patterns and the interfering signal transmitting antenna patterns; and/or B. When there is collocation and overlap between desired signal receiving antenna patterns and the interfering signal receiving antenna patterns.

Such interference between collocated overlapping antenna patterns typical occurs in backhaul feeder implementations, when the same frequency band is used for the communication of a plurality of SBBSs.

SUMMARY OF THE INVENTION

The present invention, in some embodiments thereof, relates to a method of cancelling interference in a wireless system, wherein the interference introduced by an interfering signal causing reception of an interfered signal responsive to transmission of a desired signal, the method comprising acquiring the interfering signal from a transmitter during or before transmission thereof, generating an analog cancellation signal based on the acquired interfering signal, and injecting said analog cancellation signal into an interfered receiver receiving said interfered signal to reduce said interference therefrom.

The method may further comprise estimating a reception interference based on at least one previously received interfered signal, wherein the analog cancellation signal is generated based on the estimated interfered reception and the acquired analog signal. Optionally, the acquiring includes acquisition of digital data, and the computing is carried out in frequency domain. Alternatively, the acquiring includes acquisition of analog data, and the computing is carried out in frequency domain.

The injecting may employ a transmitter which may be part of a transceiver comprising the interfered receiver. Optionally, the injecting is into an analog reception path of the receiver. Alternatively, the injecting is into a digital reception path of the receiver. In optional embodiments the interfered signal may be received by a receiving antenna located adjacent to a transmitting antenna from which the interfering signal is transmitted.

The present invention, in some embodiments thereof, relates to a method of cancelling interference in a wireless system, wherein the interference introduced by an interfering signal causing reception of an interfered signal responsive to transmission of a desired signal, the method comprises acquiring analog signals generated by a transmitter during or before transmission of the interfering signal, generating a digital cancellation signal based on the acquired analog signal, and summating in an interfered receiver receiving said interfered signal the digital cancellation signal and the interfered transmission to reduce the interference therefrom.

The acquiring may comprise digital acquisition of the generated signals. Alternatively, the acquiring may comprise analog measurement of the generated signals.

Optionally, the summating is into a digital reception path of the receiver.

The interfered signal may be received by a receiving antenna located adjacent to a transmitting antenna from which the interfering signal is transmitted.

The method may further comprise estimating a reception interference based on at least one previously received interfered signal, wherein the analog cancellation signal is generated based on the estimated reception interference and the interfering transmitter output.

The acquiring may comprise receiving the generated analog signals using an additional receiver coupled to the measured transmitter. Optionally, the additional receiver is part of a transceiver comprising the transmitter from which the interfering signal is transmitted.

The estimating may include computing cross correlation between at least one previously received interfered signal to which a cancellation signal been injected or summated and the measured signals, and determining a plurality of coefficients based on said cross correlation computation, wherein the coefficients used for generating the cancellation signal.

The estimating may utilize an adaptive filter configured to generate a plurality of coefficients based on at least one previously received interfered signal to which a cancellation signal been injected or summated, and the plurality of coefficients may be used for generating the cancellation signal. Optionally, at least one previously received interfered signal comprises at least one previously received interfered signal to which a cancellation signal been injected or summated.

The method may further comprise receiving the interfered transmission using a multi beam antenna configured for selecting a beam introducing minimum interference error.

The method may further comprise transmitting the interfering signal using a multi beam antenna configured for selecting a beam introducing minimum interference error.

The method may further comprise transmitting the interfering signal using a set of antennas configured to steer null toward the antenna of the interfered receiver.

The method may further comprise receiving the interfered signal using a set of antennas configured to steer null towards the antenna of the interfering transmitter.

The method may further comprise adjusting power of a transmitter from which the interfering signal is transmitted to a maximal value causing limited interference or degradation in the receiver if after the result of the injecting or summating residual error in the obtained signal is still high.

The present invention, in some embodiments thereof, relates to a multiple input multiple output antennas configuration comprising a plurality of interfered receivers each adapted to perform the interference cancelling methods described hereinabove or hereinbelow.

The present invention, in some embodiments thereof, relates to use of any of the interference cancelling method described hereinabove or hereinbelow, against intentional electronic jamming of the desired signal.

Optionally, the adaptive filter is a finite impulse response filter.

The estimating may comprise frequency domain wideband acquisition and tracking.

The method may further comprise equalizing frequency response of the injecting to compensate for unknown amplitude and phase frequency response thereof.

The methods described hereinabove or hereinbelow may be used to provide reduced degree of freedom for beamformer weights setting.

The present invention, in some embodiments thereof, relates to a method of cancelling interference introduced in a wireless system into a desired signal transmitted from a primary antenna of a primary transmitter, wherein the interference introduced by an interfering signal transmitted from a secondary antenna of a secondary transmitter, and wherein the primary and secondary antennas being adjacently located, the method comprising acquiring the interfering signal before or during transmission thereof, estimating reception interference based on the acquired interfering signal, generating a cancellation signal based on the estimating and the acquired interfering signal, and injecting the cancellation signal into the primary transmitter for reducing interference related to the interfering signal at a primary receiver receiving a composite signal comprising the desired signal and the interference.

Optionally, the injecting is into an analog transmission path of the primary transmitter. Alternatively, the injecting is into a digital transmission path of the primary transmitter.

The primary and secondary transmitters may be transmitters with directional antennas having partially overlapping transmitter antenna patterns.

The method may further comprise a reciprocal cancellation performed for cancelling in the secondary transmitter interference introduced by an interfering signal transmitted from the primary antenna of the primary transmitter. The cancellation signal may be generated based on the estimating carried out for signal cancellation in the primary transmitter.

The interference cancellation method may used in a plurality of primary antennas and a plurality of secondary antennas each adapted to carry out the interference cancellation.

Optionally, the estimating is carried out in a remote receiver receiving the interfering signal and configured to provide a plurality of coefficients based on at least one previously received interfered signal, further comprising transmitting the coefficients to the primary transmitter for generating the canceling signal.

Optionally, the primary and secondary transmitters are respective parts of primary and secondary hub transceivers in a hub and spoke communication network.

The present invention, in some embodiments thereof, relates to method of cancelling interference introduced in a wireless system into a desired signal transmitted to a primary antenna of a primary receiver, wherein the interference introduced by an interfering signal transmitted to a secondary antenna of a secondary receiver, and wherein the primary and secondary antennas being adjacently located, and the primary receiver receives a composite signal comprising the desired signal and the interference, the method comprises acquiring the interfering signal as received through the secondary antenna, estimating reception interference of the interfering signal based on the acquired interfering signal, generating a cancellation signal based on the estimating and the acquired interfering signal, and summating in the primary receiver the composite signal and the cancellation signal to reduce the interference.

The primary and secondary receivers may be receivers with directional antennas with partially overlapping receiver antenna patterns.

The method may further comprise a reciprocal cancellation performed for cancelling in the secondary receiver interference introduced by an interfering signal received by the primary antenna of the primary receiver. Optionally, the cancellation signal is generated based on the estimating on the carried out for signal cancellation in the primary receiver.

The method may be implemented in plurality of primary antennas and a plurality of secondary antennas each adapted to carry out the interference cancellation.

Optionally, the estimating is performed by temporarily muting of the primary transmitter.

Optionally, the estimating is performed by transmission of a pre-known interfering signal to the secondary receiver.

Optionally, the primary and secondary receivers are respective parts of primary and secondary hub transceivers in a hub and spoke communication network.

The method may be used for cancelling wideband interference.

Optionally, the interfered receiver may be saturated due to the interference during an initial operating stage.

Optionally, the estimating includes computing a cross correlation between at least one previously received interfered signals to which a cancellation signal been injected or summated and the measured signals, and determining a plurality of coefficients based on the cross correlation computation, and the coefficients used for generating the cancellation signal.

The estimating may utilize an adaptive filter configured to generate a plurality of coefficients based on at least one previously received interfered signal to which a cancellation signal been injected or summated, and the plurality of coefficients are used for generating the cancellation signal.

The method may further comprise adjusting power of a transmitter from which the interfering signal is transmitted to a maximal value causing limited interference or degradation in the receiver if after the result of the injecting or summating residual error in the obtained signal is still high.

The present invention, in some embodiments thereof, relates to a multiple input multiple output antennas configuration comprising a plurality of interfered receivers each adapted to perform the interference cancelling according to any one of interfering cancellation methods described hereinabove or hereinbelow.

The present invention, in some embodiments thereof, relates to use of the interference cancelling method according to any one of the interfering cancellation methods described hereinabove or hereinbelow, against intentional electronic jamming of the desired signal.

Optionally, the adaptive filter is a finite impulse response filter.

Optionally, the estimating comprises frequency domain wide-band acquisition and tracking.

The present invention, in some embodiments thereof, relates to a system for cancelling interference in a wireless system, wherein the interference introduced by an interfering signal causing reception of an interfered signal responsive to transmission of a desired signal, the method comprising a first multiplier which multiplies a frequency domain representation of the interfered signal to which a cancellation signal been applied, by a conjugate of a frequency domain representation of the interfering signal, and a second multiplier which multiplies a modified multiplication result obtained from the first complex multiplier and scaled using a predefined scaling factor, by the frequency domain representation of the interfering signal, thereby generating the cancelling signal.

The present invention, in some embodiments thereof, relates to a system for cancelling interference in a wireless system, wherein the interference introduced by an interfering signal causing reception of an interfered signal responsive to transmission of a desired signal, the method comprising an interference cancellation signal generator which acquire the interfering signal before or during transmission thereof, and which generates an interference cancellation signal based on the acquired interfering signal, and an analog injector which injects the cancelling signal into a receiver during reception of the interfered signal. Optionally, the interference cancellation signal is digitally generated.

The present invention, in some embodiments thereof, relates to a system for cancelling interference in a wireless system, wherein the interference introduced by an interfering signal causing reception of an interfered signal responsive to transmission of a desired signal, the system comprises an analog receiver configured to receive signals generated by a transmitter during transmission of said interfering signal, and an interference cancellation signal generator which receives the generated signal before or during transmission thereof, and which generates an interference cancellation signal based on the received signals.

The system may further comprise a first signal summation unit which summates the scaled multiplication result with a previous summation result thereof stored in a buffer, wherein the summation result is used as the modified multiplication result in the second multiplier.

The system may further comprise an analog receiver configured to receive the interfering signal and input the interfering signal to the multipliers.

Advantageously, the system according may be used for cancelling interference in a cellular communication network.

The system may further comprise a dedicated transmitter performing the analog injection.

The system may further comprise a dedicated receiver performing the analog reception.

The present invention, in some embodiments thereof, relates to a system comprised of a plurality of transceivers using directional antennas with mutual partial overlapping radiation pattern antennas arranged as HUB for backhaul application, each transceiver comprising a cross-lobe cancellation mechanism fed by overlapping transceivers.

Optionally, the plurality of transceivers is fully reusing the same time and/or frequency resources.

The system may further comprise at least one centralized interference cancellation processor which generates cancellation signals for the plurality of transceivers, wherein all transmitted and received signals in the HUB or backhaul application are available to said centralized interference cancellation processor for interference cancellation signals processing.

The wireless communication in some of the embodiments of the present invention may be in the RF and/or IF ranges. Some of the embodiments of the present invention relates to optical communication.

It is noted that the signal acquisition may be made before the signal to be transmitted reach the transmitter (e.g., in the input of the transmission). Alternatively, the acquisition is made in the analog or digital circuitry of the transmitter, or between the transmitter and the transmitting antenna.

The summation and/or injection of cancellation signals may be made before the receiver (e.g., between the receiver and the receiving antenna), or within analog signal circuitry of the receiver, all of which are generally referred to herein as analog reception paths. Alternatively, the summation and/or injection are made within digital processing portions, such as digital circuitry of the receiver, which generally referred to herein as digital reception path.

The acquired signals may be generated in the interfering transmitter due to various deficiencies, such as noise, illinearity, leakage, and such like. Accordingly, the interfering signal may be intermittently generated transmitted to introduce the received interference. Furthermore, the acquiring of the interfering signal can also be due to digital precursor.

The distance between collocated antennas may generally 0.5 wavelength of the RF signal, and can go up to 3 wavelengths.

The number of collocated antennas and/or transceivers may generally be in the range of 2 to 1000, optionally in the range of 2 to 10, yet optionally about 3, 4, 5, 6 or 7. The collocated antennas may have overlapping antenna patterns, however, some of the collocated antennas may not have overlapping antenna patterns, or just partial overlapping antenna patterns (e.g., only at one side).

The reduction in power of interference after the interference cancellation may generally be in the range of 8 to 100 db, optionally about 10 to 40 db.

Interfering signal is wideband when its bandwidth is substantially higher than the coherent bandwidth of the channel (e.g., a signal having 10 Mhz bandwidth is regarded wideband if its channel coherent bandwidth is 100 KHz).

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system which may employ application programs that are managed by the operating system. It should be understood by one of ordinary skill in the art that embodiments of the invention can be implemented using various computer devices, such as personal computers, servers, and other devices that have processors or that are capable of executing programs or sets of instructions. In general, the invention can be implemented using existing hardware or hardware that could be readily created by those of ordinary skill in the art. Thus, the architecture of exemplary devices has not always been explained in detail.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory of any type for storing instructions and/or data and/or a non-volatile storage, for example, a magnetic hard-disk, flash memory, and/or removable media, for storing instructions and/or data. The processor can be a type of microprocessor, a programmable logic control, an application specific integrated circuit, or a computing device configured to fetch and execute instructions.

BRIEF DESCRIPTION OF THE DRAWINGS

Particular, non-limiting embodiments of the invention will be described with reference to the following description of embodiments, in conjunction with the figures. The figures are generally not shown to scale and any measurements are only meant to be exemplary and not necessarily limiting. In the figures, identical structures, elements or parts which appear in more than one figure are optionally labeled with a same or similar number in all the figures in which they appear, in which:

FIGS. 1A and 1B show general structures of wireless communication networks, wherein FIG. 1A illustrates a possible LTE backhaul transmission network and FIG. 1B illustrates a possible macro base stations and backhaul subscriber configuration;

FIG. 2B illustrates employing beam formers to cancel the receiver-transmitter interferences, FIG. 2C is a block diagram illustrating hub receiver interference cancellation, and FIGS. 2D and 2E are block diagrams illustrating transmitter interference cancellation;

FIGS. 3A and 3B are block diagrams schematically illustrating interference cancellation loops in accordance with some embodiments of the invention, wherein FIG. 3A shows an exemplary implementation combining primary analog and secondary digital interference cancellation loops, and FIG. 3B shows an exemplary configuration of a primary interference cancellation loop;

FIGS. 4A to 4E are block diagrams schematically illustrating LMS control in accordance with some embodiments of the invention, wherein FIG. 4A depicts general LMS controller module structure, FIG. 4B exemplifies a possible LMS control embodiment, FIG. 4C exemplifies a possible LMS pre-equalizer weight calculation loop, and FIGS. 4D and 4E demonstrate calculation of cancellation signal using the OLAS algorithm;

DESCRIPTION OF EMBODIMENTS OF THE INVENTION

Figure 1A:
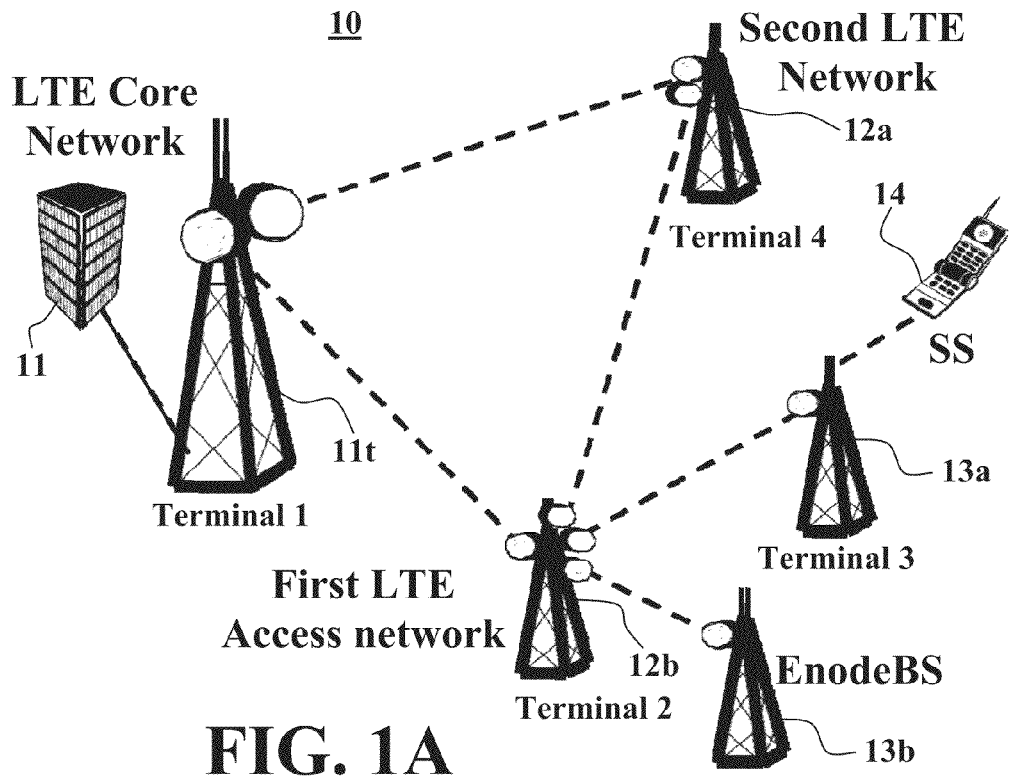

The present invention, in some embodiments thereof, relates to method and system of canceling self, adjacent channel, and/or cross-lobe interferences (e.g., interferences introduced due to overlap in antenna radiation pattern of adjacently located receiving and transmitting antennas) which typically appear when two or more proximally located antennas of collocated receivers and transmitters are operating concurrently. In general, the interference cancellation techniques of some embodiments of the present invention utilize interference cancellation loops for processing the interfering signals and generating a suitable cancellation signal to be injected in the analog and/or digital signal processing path of the interfered receiver that receives the interfered target signal.

Some exemplary embodiments of the present invention relate to configurations wherein the interfering transmitters and interfered receivers, and their antennas, are collocated (e.g., in the same hub or tower), such that the interfered receivers can be provided with prior knowledge of the transmitted interfering signals directly from the collocated interfering transmitters. Optionally or alternatively, such prior knowledge is provided by sampling at a remote transmitter and/or receiver and sending data based on that sampling.

Multiple cancellation loops may be employed for canceling interference introduced in the received target signal. For example, the prior knowledge of the interfering signal enables the interfered receivers to generate suitable cancelling signals that can be summated with the received interfered target signals.

In possible embodiments one or more cancellation loops of the present invention may be used in parallel and/or intermittently to generate the interference cancellation signals. For example, in an exemplary embodiment an initial interference cancellation loop may used to generate digital interference cancellation signals during the initial activation stages to be added to the received interfered target signal in digital processing stages thereof, to substantially cancel introduced interferences. Thereafter, one or more additional interference cancellation loops may be activated concurrently with, or in place of, the initial cancellation loop, to generate interference cancellation signals to be summated in the analog reception and/or digital processing stages of the received target signal.

For example, the summation may be performed in a primary cancellation loop by directly injecting a generated analog cancelling signal into the RF path input of the interfered receiver (e.g., in case the composite signal saturate the receiver, the injected RF path is aimed to reduce the composite signal level to a working point where the receiver becomes sufficiently linear). In a secondary cancellation loop, interference cancellation may be carried out by summing the interfered target signal with a suitable cancellation signal for suppressing out-of-band (in-band for the receiver) components of the interfering signal, that are typically caused due to non linearity, phase noise, or other deficiencies related to the transmitter of the interfering signal. The cancellation signal used in the secondary loop may be generated based on signal samples taken directly from the interfering transmitter output (e.g., using a sampling receiver tuned to the out of band zone of the transmitter).

In the secondary cancellation loop the cancellation is performed in the digital signal processing stages of the received signal. The primary analog cancellation loop may be employed to avoid receiver front end saturation and practically to increase the signal instantaneous dynamic range at the receiver for the desired input, while the secondary digital loop may be used to suppress outband transmitter residuals introduced due to non linearity, or any other factor, that interfere the target signal receiver in its inband communication frequencies. The prior knowledge of the interfering signal may comprise, for example, the actual interfering signal before transmission thereof, the content of the interfering signal before it is modulated by the interfering transmitter, and/or other characterizing features.

The interference cancellation signal may be generated based on frequency domain acquisition and tracking of wideband interference channel. In some exemplary embodiments of the present invention the primary interference cancellation loop utilizes an injector transmitter implemented by RF circuitry having unknown frequency response, both in amplitude and phase. In such exemplary embodiments the cancellation process of the primary cancellation loop can be significantly hampered. In order to compensate for the unknown frequency response in some embodiments wideband calibration of the RF injector is carried out based on an additional converging loop.

As used herein, a cancellation loop, or interference cancellation loop, is a loop designed to generate a cancelling signal based on previous interference cancellation results obtained.

In some exemplary embodiments of the present invention the interference cancellation may comprise additional interference cancellation loops, optionally operating together with the primary and secondary cancellation loops, depending on the specific configuration. All or some of the following additional cancellation loops can be employed with the primary and/or secondary cancellation loop:

1) Antenna beam former loop: in this loop the interfering transmitter transmits via a set of antennas comprising two or more antennas such that the composite pattern of the transmitter antenna array forms null toward the receiver of the interfered target signal.
2) Transmitter outband noise loop: in this loop the noise of the transmitter is sampled for digitally injecting a corresponding interference cancelling signal to the receiver baseband in order to cancel the entered noise.
3) Beam selection loop: this loop employs multi beam antenna in the collocated transmitter and/or receiver with a switch that selects the beam that will introduce the minimum interference error. In this loop a toggling process may be used that seeks for minimum error in the received target signal.

4) Power control loop: this loop allows adjusting the transmitter power to the maximum value that will still prevent interference or degradation in the receiver. For example, this loop may be employed to set the power of the interfering transmitter in cases wherein after all other cancellation loops been applied the residual error in the received target signal is still high.

In some embodiments of the present invention the primary loop and/or the Transmitter outband noise loop are used, while any of the other cancellation loops described herein may optionally also used Some exemplary embodiments of the present invention relate to cancellation of co-channel and adjacent channel interferences introduced due to antennas pattern partial overlap occurring when signals from collocated transmitters antennas (e.g., located in the same hub/tower) are transmitted towards respective adjacently located target receivers. In an exemplary embodiment of the invention, the interference cancellation may be carried out by adjusting the transmitted signals using suitable cancellation signals before they are being transmitted (also referred to herein as 'downlink cancellation'), and/or by adjusting the received interfered signals by adding suitable cancellation signals at the receivers (also referred to herein as 'uplink cancellation').

In the downlink cancellation, the cancelling signals are optionally generated in each collocated transmitter based on signals that are about to be transmitted from all other collocated transmitters. Each collocated transmitter summates the cancellation signal generated therein with the signal transmitted therefrom for steering null towards its target receiving antenna in the composite interfering antenna pattern. In this way the cancelling signals are summed with the interfering signals over the air before reaching the receiving target antennas of the interfered target receivers.

In the uplink cancellation a cancelling signal is generated in each collocated target receiver based on samples of signals received in the other collocated receivers. The cancellation signal is then summated with the target signal received in the target receiver for substantially cancelling the interferences introduced. The cancellation signal may be summed digitally in each receiver with the received signal in order to cancel the introduced interfering ingredients.

Alternatively or additionally, coefficients pertaining to the cancellation signals for the 'downlink cancellation' may be calculated at the remote receivers based on the signals that are being received, and then transmitted via their antennas to their respective transmitters for generation of suitable cancellation signals to be summated with transmitted signals for nulling the interferences.

In possible embodiments of the invention employing TDD duplexing, wherein the downlink transmitters and uplink transmitter use the same frequency, coefficients for downlink cancellation may be calculated from coefficients calculated for the uplink cancellation exploiting the fact that the channel uplink and downlink response is more or less identical. Additional calibration may be required to compensate for the different frequency response of the transmitters and receivers chains in the hub.

The interference cancellation techniques of the present invention in some embodiments thereof can be applied to any wireless broadband communication technologies such as, but not limited to, OFDM, OFDMA, CDMA, WCDMA, and suchlike.

The calculation of the cancellation signal may be based on computation of cross-correlation between an interfering signal acquired before transmission thereof and a received interfered signal on which one or more cancellation loops have been applied during its transmission or reception. Coefficients of the cancellation signal may be generated based on the cross-correlation result, and used to generate the cancellation signal. Alternatively, the acquired interfering signal is input to an adaptive filter configured to generate the cancellation signal coefficients used for generating the cancellation signal. Coefficients of the adaptive filter may be adjusted before applying the acquired interfering signal based on the previously received target signals, and/or based on previously acquired interfering signals.

The adaptive filter may be implemented as a finite impulse response filter, for example. The coefficients of the adaptive filter may be modified by means of direct covariance matrix inversion, root least square, or any other minimum square error method.

In other possible embodiments of the present invention an adaptive filter configured to process overlapping blocks of the acquired interfering signal is utilized such that the cancellation loop is not synchronized to the interfering signal even if it is of OFDM type (timing synchronization is of course required), or of any other broadband type. (e.g., what is skipped is the synchronization to the OFDM frame, for example by utilizing OLAS/WOLA filtering, in which case the cancellation assumes arbitrary unknown desired and interferer signals).

In some possible embodiments of the present invention the interference cancellation signal is generated by adaptively filtering in frequency domain the interfered signal to which one or more cancellation loops been applied during transmission or reception thereof by temporarily converting it to frequency domain (e.g., by a Fast Fourier Transform (FFT)), multiplying the converted signal by coefficients of the adaptive filter, and then converting the multiplied frequency domain signal into time domain (e.g., by applying an inverse fast Fourier transform (IFFT)). This adaptive filtering can be repeatedly carried out on overlapping contiguous blocks of the received interfered signal, either by adopting the overlap and save (OLAS) approach (e.g., by buffering in each filtering cycle half of the samples of the processed interfered signal block for use in the next filtering cycle), or by adopting the Windowed Overlap and Add (WOLA) approach (e.g., by windowing successive overlapping filtered results and adding them together).

In other possible embodiments of the present invention the cancellation loop is carried out using tap delay line, or finite input response filter (FIR) wherein each tap multiplier is set by the control module of the cancellation loops.

Unlike conventional interference cancellation solutions that employ echo cancellation, the present invention in some embodiments thereof may employ cancellation in the analog/RF domain. Furthermore, as opposed to conventional smart antenna techniques, some embodiments of the present invention may be implemented without requiring additional RF hardware and antennas beyond the original setups required for operating the PTP links.

As opposed to conventional 'smart antenna' techniques that requires N+1 antennas, in exemplary embodiments of the present invention the antennas directional pattern is partially overlapping, which allows using N antennas for cancelling N interfering signals, without degrading significantly the desired reception gain.

A further difference between some exemplary embodiments of the present invention and conventional smart antenna techniques is in that the interference rejection in the present invention may be achieved in frequency domain using the existing hardware (i.e., by implementing interference cancellation loops completely by software or firmware).

Before explaining at least one embodiment of the present invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The TRIC and CLIC Concepts

Figure 14:
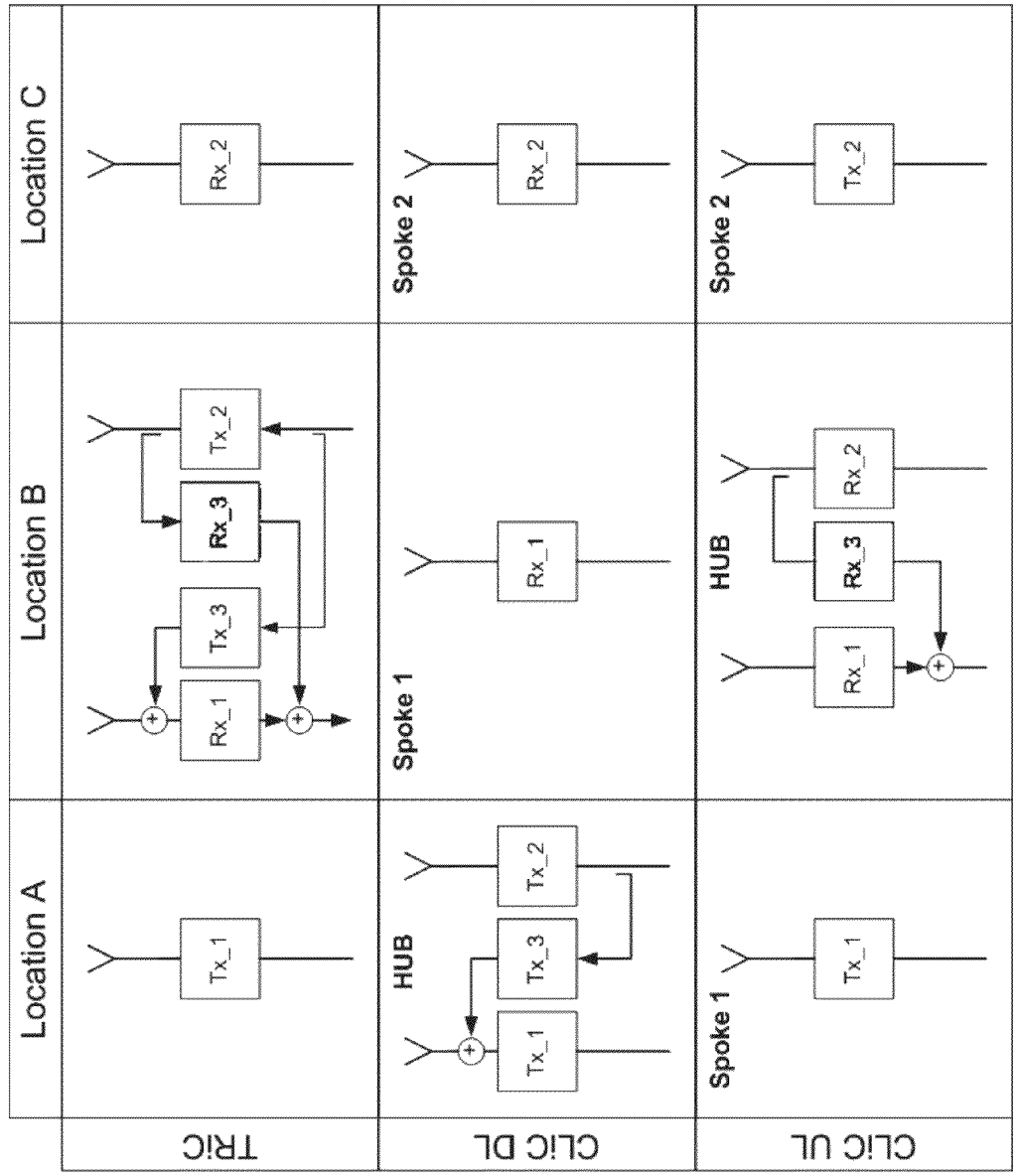
FIG. 14 schematically illustrates general TRIC and CLIC concepts used in exemplary embodiment of the present invention.

FIG. 14 schematically illustrates the general TRIC (transmit receive interference cancellation) and CLIC (cross lobe interference cancellation) approach used in exemplary embodiments of the present invention. The TRIC and CLIC concepts will be now described with reference to various scenarios demonstrated in FIG. 14.

For example, TRIC schemes are employed when desired receiver (Rx1) and interfering transmitter (Tx2) are collocated (Location B in row 1). In such cases two major TRIC loops are employed. More particularly, a cancellation transmitter (Tx3) is used to compensate interference received in Rx1 due to compensate interference effects (such saturation, input IP3, ADC resolution, etc.) occurring due to signal transmission from Tx2, and cancellation receiver (Rx3) is used to compensate for Tx2 deficiencies (Such as transmit power amplifier output IP3, Local Oscillator background noise, amplified thermal noise).

In another example, when Rx1 and Tx2 are not collocated (CLIC DL/UL—second and third raw) downlink CLIC and/or uplink CLIC schemes may be utilized. More particularly, in case where Tx1 and Tx2 are collocated (typical HUB downlink scenario) and have partially overlapping antenna patterns then Tx3 is introduced at Tx1 antenna instead of Rx1 antenna (in TRIC), creating the same cancellation effect at Rx1. In case where Rx1 and Rx2 are collocated (typical HUB uplink scenario) and have partially overlapping antenna patterns then Rx3 uses signal acquired from Rx2 antenna instead of Tx2 antenna (in TRIC), creating the same cancellation effect at Rx1.

The Tx3 and Rx3 cancellation implantations can be completely realized in addition to the primary and secondary transceivers, or when possible, realized partially and joined at a certain stage (e.g. at baseband, IF, RF, etc.) to the primary and secondary transceivers to reduce implementation complexity. In any case these techniques do not require adding separate antennas for cancellation purpose.

Self Interference Between Adjacent Transmitter and Receiver

Figure 1B:
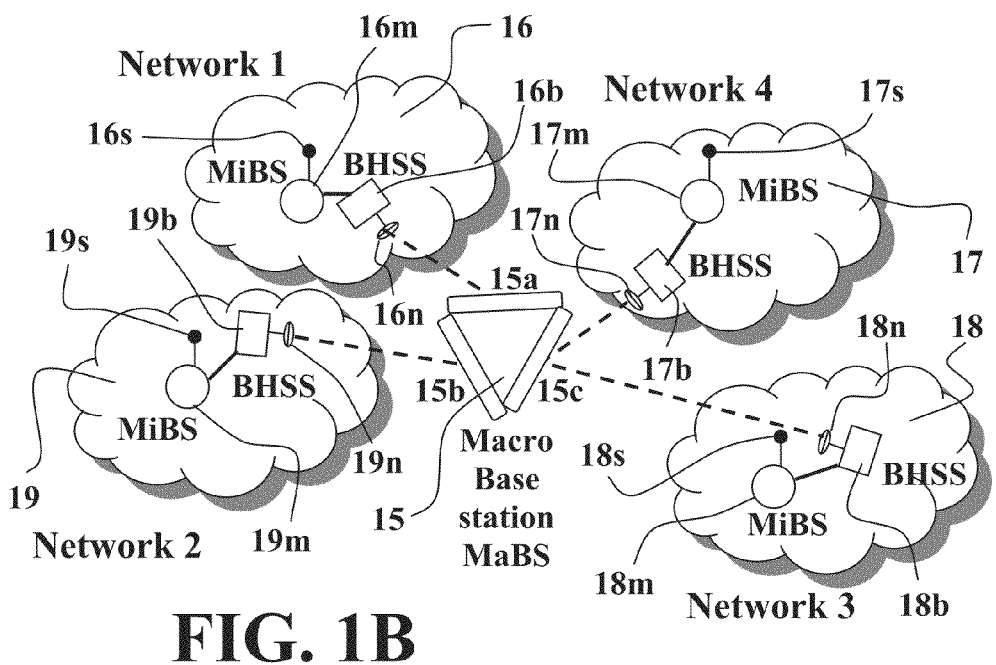

With reference to FIG. 1B wherein there is shown a possible relayed network employing SBBS networks 16, 17, 18 and 19, linked to MaBS 15. As seen, each SBBS may comprise at least two transceivers:

(i) Micro BS (MiBS—Second Transceiver)—transceivers 16m, 17m, 18m and 19m, carrying the base-station function within the SBBS and which communicates with subscriber stations (SSs) 16s, 17s, 18s and 19s; and (ii) Backhaul Subscriber Station (BHSS—First Transceiver)—transceivers 16b, 17b, 18b and 19b, dedicated to carrying the backhaul function within the SBBS by communicating with the MaBS 15.

In order to provide high backhaul capacity, directional antennas, 16n, 17n, 18n or 19n, may be employed for the backhaul link, and an improved line of sight between directional antennas 16n, 17n, 18n or 19n, and the antennas of MaBS 15 should be achieved. The MaBS 15 in this example has three sectors covered by antennas, 15a, 15b and 15c, each covering a third of the network area. Each of the four MiBSs 16m, 17m, 18m and 19m, in FIG. 1B has a single sector, in which its respective unidirectional antenna operates. The MaBS 15 communicates the BHSSs, 16b, 17b, 18b and 19b, as conventional SSs that are registered to it.

It is noted that FIG. 1B is provided herein for the purpose of illustration, and that in specific implementations of MaBS 15 may have any number (e.g., 3-12) of sectors/lobes (e.g., by using additional antennas to provide polygon antennas structures), antenna arrays, or MIMO configurations, for example, as will be exemplified hereinbelow.

Primary Analog Loop Cancellation

In some exemplary embodiments of the present invention the primary analog loop cancellation is used to generate a direct cancellation signal in the frequency domain from the interfering signal provided by the interfering transmitter, which is transformed into a time domain signal to be summated in the interfered receiver analog RF path. The cancellation signal is calculated based on the transmitted interfering signal to obtain a certain amplitude and phase adjustment that will be added to the incoming interfering leakage signal introduced from the same transmitter, such that the summated signal will have reduced interfering power.

Figure 3A:
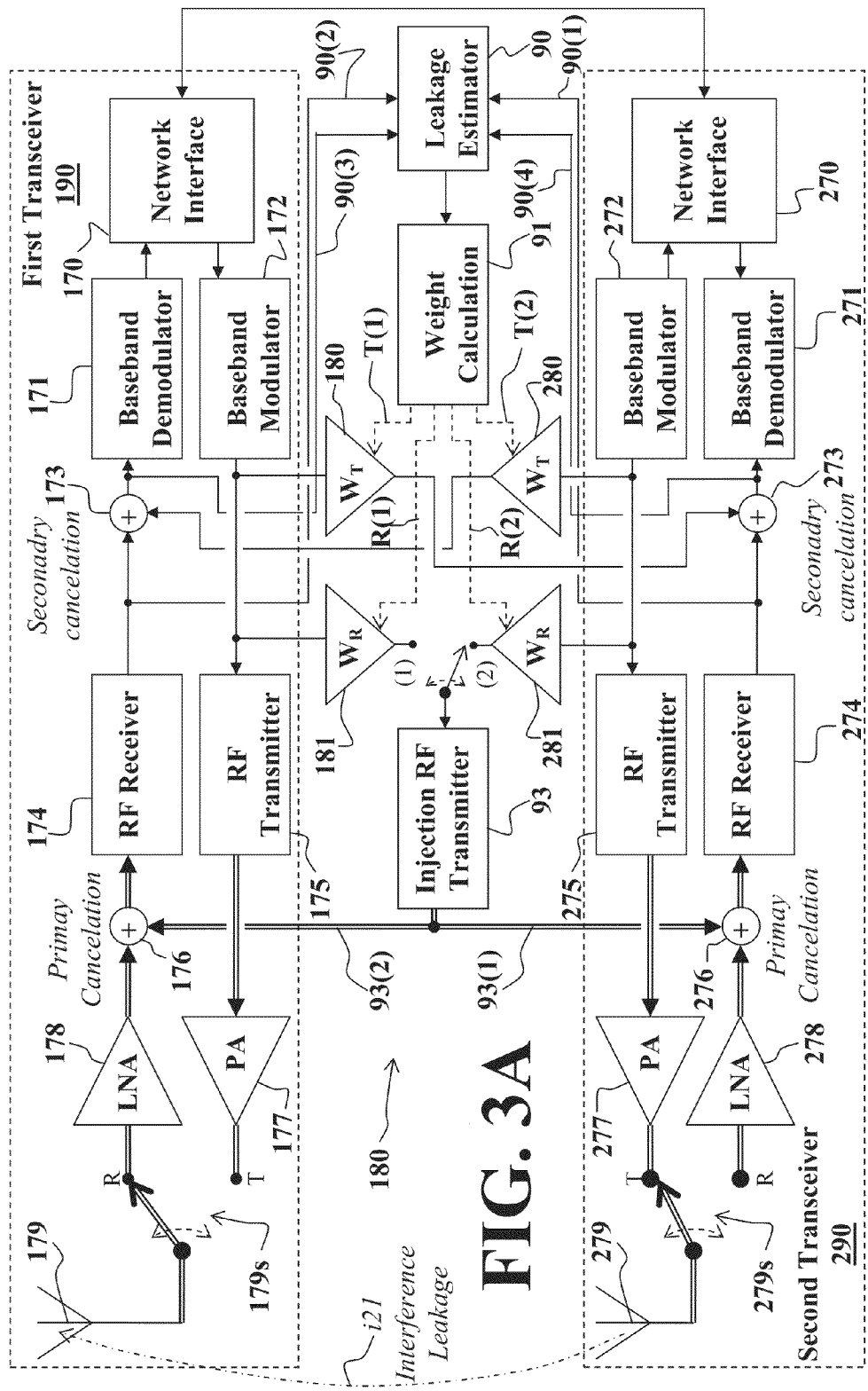

FIG. 3A schematically illustrates a possible primary analog loop cancellation embodiment of the present invention in a system with two collocated transceivers 190 and 290, equipped with a mutual interference cancellation module 180 operating between them. The doubled-line connections in FIG. 3A represents analog and RF lines, whereas single line connections represent digital lines. The duplexing mode in this example is TDD, such that when one transceiver is in its transmitting mode interference cancellation is performed in the second collocated transceiver that is in its receiving mode. Similarly, during the next TDD frame, the first transceiver is transited to receiving mode and the second transceiver is transited to transmitting mode, and the cancellation process is reversed to the first transceiver.

The cancellation is conducted by causing each transmitter, 175 or 275, in turn, to send a unique short training signal that will be received by the counterpart receiver, 274 or 174, that will be tuned to the frequency of the transmitter. The training signal can be the actual payload data that the transmitter transmits already, and the training duration can be in this case the whole DL sub-frame.

Since the interfering transmitter and interfered receiver may not be tuned to the same channel, another receiver (not shown) (also referred to herein as additional loop control receiver) may be used. This additional receiver is tuned to the channel of the interfering transmitter and used for controlling the loop in order to calculate the cancellation weights at 91. Advantageously, the additional receiver may be set to receive the interference with a gain higher than the desired gain of the signal receiver in order to acquire a stronger interference signal for improved weight estimation. The risk of saturation in the initial phase is low since it is assumed that with the culmination of the process the loop-control receiver will recover from the initial saturation.

In another possible embodiment of the present invention the second RF receiver that is usually not used during the pertinent TDD sub-frame and is already tuned to the correct frequency can be used during the sub-frame as an additional loop control receiver. For this purpose a special switching circuit (not shown) may be incorporated in the input and output of the receiver used as the additional loop control receiver.

In an exemplary embodiment of the invention, the output signal from the receiver is used for estimating the loop weights by leakage estimator 90 and weight calculation unit 91. The estimated loop weights are then used in the interference cancellation. For example, in cancellation of interference i21 introduced by signal transmitted from transceiver 290 in reception of transceiver 190, primary loop leakage estimator 90 estimates the leakage data of both error signals of the $1^{st}$ cancellation loop and the of the $2^{nd}$ cancellation loop based on signals obtained from these cancellation loops: signal 90(2) provided from receiver 174, and signal 90(3) obtained from signal summation unit 173, respectively.

In an exemplary embodiment of the invention, the leakage data from leakage estimator 90 is used by weight calculation unit 91 to set complex weight value R(2). Complex weight value R(2) is multiplied at 281 by the output of modulator 272. The multiplied modulator output is then used by the injection RF transmitter 93, that is tuned to the same frequency of the original interfering transmitter 275, to produce interference cancelling signal 93(2) summated at 176 with the signal received from antenna 179. In the secondary cancellation loop leakage estimator 90 estimates the leakage reference data based on signal 90(3) from signal summation unit 173, which is then used by weight calculation unit 91 to set complex weight value T(2). Complex weight value T(2) is multiplied at 280 by the output of modulator 272 and the multiplied modulator output is then summated at 173 with the output signal of receiver 174.

Similarly, in cancellation of interference introduced by signals transmitted from transceiver 190 in reception of transceiver 290 cancellation signal 93(1) is generated by providing leakage estimator 90 signal 90(1) provided from receiver 274, then used by weight calculation unit 91 to set complex weight value R(1). Complex weight value R(1) is multiplied at 181 by the output of modulator 172 and the multiplied modulator output is then used by the injection RF transmitter 93, that is tuned to the same frequency of the original interfering transmitter 175, to produce interference cancelling signal 93(1) summated at 276 with the signal received from antenna 279. In the secondary cancellation loop cancellation leakage estimator 90 estimates the leakage reference data based on signal 90(4) from signal summation unit 273, then used by weight calculation unit 91 to set complex weight value T(1). Complex weight value T(1) is multiplied at 180 by the output of modulator 172 and the multiplied modulator output is then summated at 273 with the output signal of receiver 274.

In order to reduce HW resources one may use the transmitter that is not being used in the sub-frame as the injecting transmitter, by tuning it to the right frequency and adding to it the proposed switching circuitry in its input and output. The output of the injecting transmitter may be combined with RF coupler (176 or 276) to the leakage RF signal, before or after the LNA 178 or 278 to facilitate the signal summation, depending which location is more sensitive to saturation.

Figure 3B:
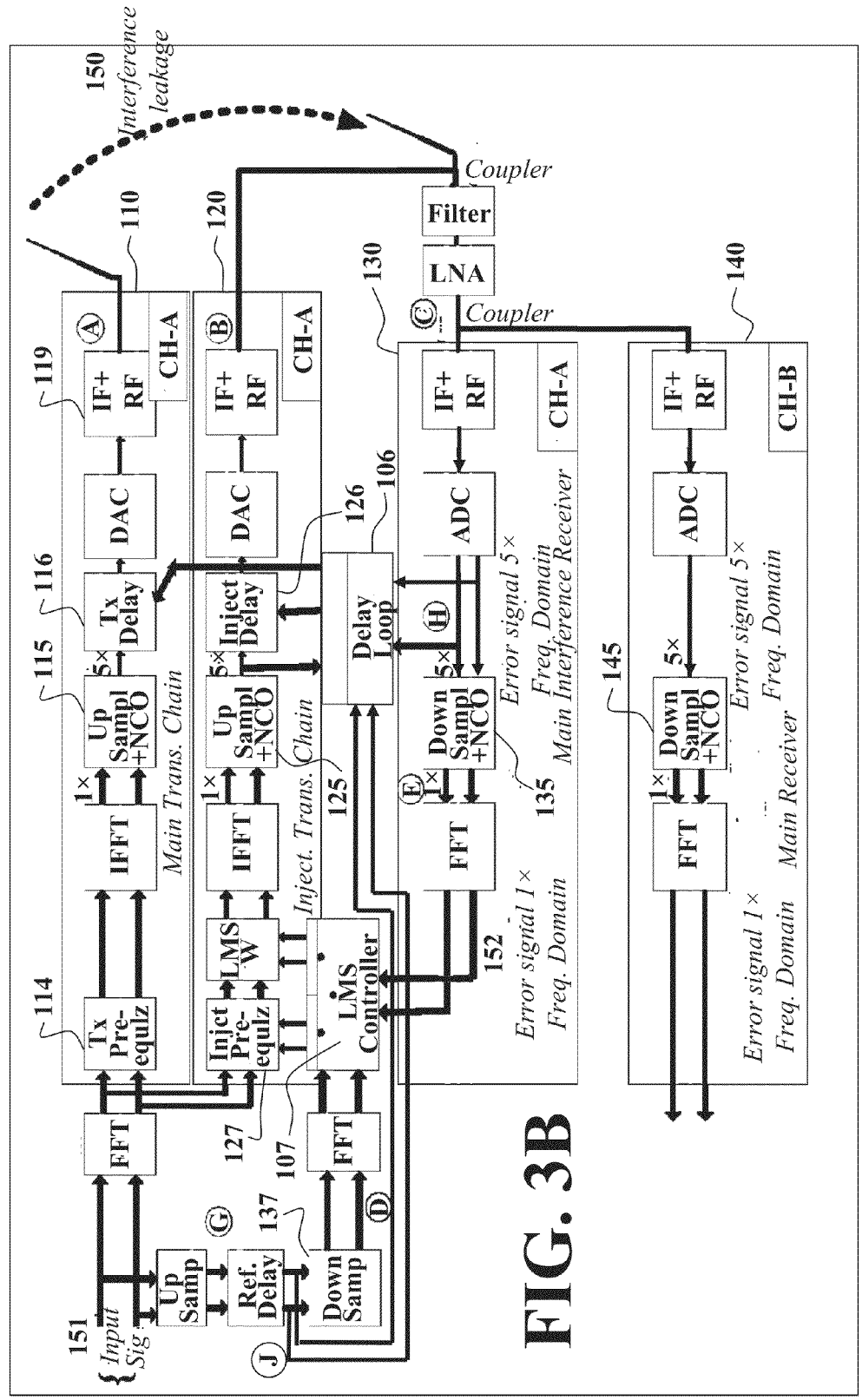

FIG. 3B is a block diagram showing with more details sub-modules of the interference cancellation loop exemplified in FIG. 3A. In this block diagram two transmitter chains are illustrated; main transmitter chain 110 and injection transmitter chain 120, and two receiver chains; main receiver chain 140 and interference receiver chain 130. The main transmitter and receiver belong to the original collocated transceivers, where the injector transmitter 120 is used for cancellation, and the interference receiver 130 is used for calculating the cancellation weights at LMS controller 107. The digital part is divided into a lower clock part 1x, and an upper clock part 5x. The transition from the 1x to the 5x clock part is carried out by interpolators, 115 and 125, whereas the opposite transition (from 5x to 1x) is carried out by down samplers, 135 and 145.

In this example the following delay blocks are used:
a) Transmit delay 116: which holds the on air transmitted signal to compensate the digital processing;
b) Injector delay 126: which is set to match the timing to the leakage signal 150 in the RF coupler; and
c) Reference delay 106: which is set to match the timings of the inputs 151 to the LMS module 107 and to the error and the reference signal 152.

These delays are set in the digital domain in the 5x part to improve signal resolution. The delay loop module 106 sets these three delay values by continuously computing cross correlation of the signals input to LMS 107 in time domain (5× rate samples obtained at the junctions denoted by J and H).

In an exemplary embodiment of the invention, the phase and amplitude of the injector chain 120 are set digitally by adaptive frequency domain filter implemented by LMS controller 107 receiving as inputs frequency domain representations of input signal 151 and of signal received in antenna of receiver 140. In one exemplary embodiment of the present invention the adaptive frequency domain filter is implemented by LMS controller 107 using Overlap and Save (OLAS) filter in frequency domain. The LMS controller 107 calculates the weights in the frequency domain from the reference digital input samples (provided in the path denoted by letters G→D) that are due to be transmitted, and from the current interfered received signal, that is also transformed into frequency domain (in the receiver path denoted by letters C→H→E). The weights are optionally calculated for each FFT term separately.

Since the injector transmitter chain 120 comprises the analog/RF part 119 of the injector, an injection pre-equalizer block 127 may be used, as illustrated in FIG. 3B. The weights of injector pre-equalizer 127 are adapted to compensate for the unknown amplitude and phase frequency response of the RF injector circuitry 120. The weights of injector pre-equalizer 127, that are also in the frequency domain, are set by LMS controller 107 when no signal is being transmitted to the transmitter 110 by zeroing coefficients of the Tx chain pre-equalizer 114. The pre-equalizer weights may be set without the presence of interference signal 150, which may be achieved during calibration period. Thereafter, the pre-equalizer weights are set by the LMS controller 107 to match injector signal (provided from down sampler 135 at E) (without the leakage) to the reference signal (provided from down sampler 137 at D), and in this way equalizes the frequency response of injector 120.

In an exemplary embodiment of the invention, Tx chain pre-equalizer 114 is optionally used to flatten in frequency domain the main transmitter chain 110 for inband filtering the transmitted signal, and for compensating for delay and to mute the transmitter 110 when the calibration process of injector pre-equalization 127 is active.

The LMS Control

Figure 4A:
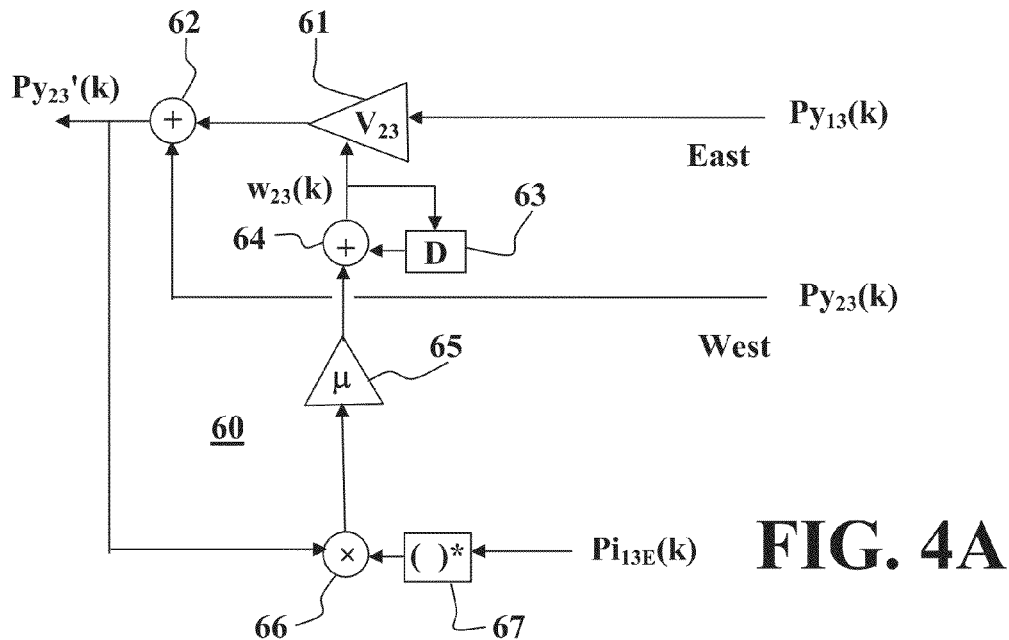
Figure 4D:
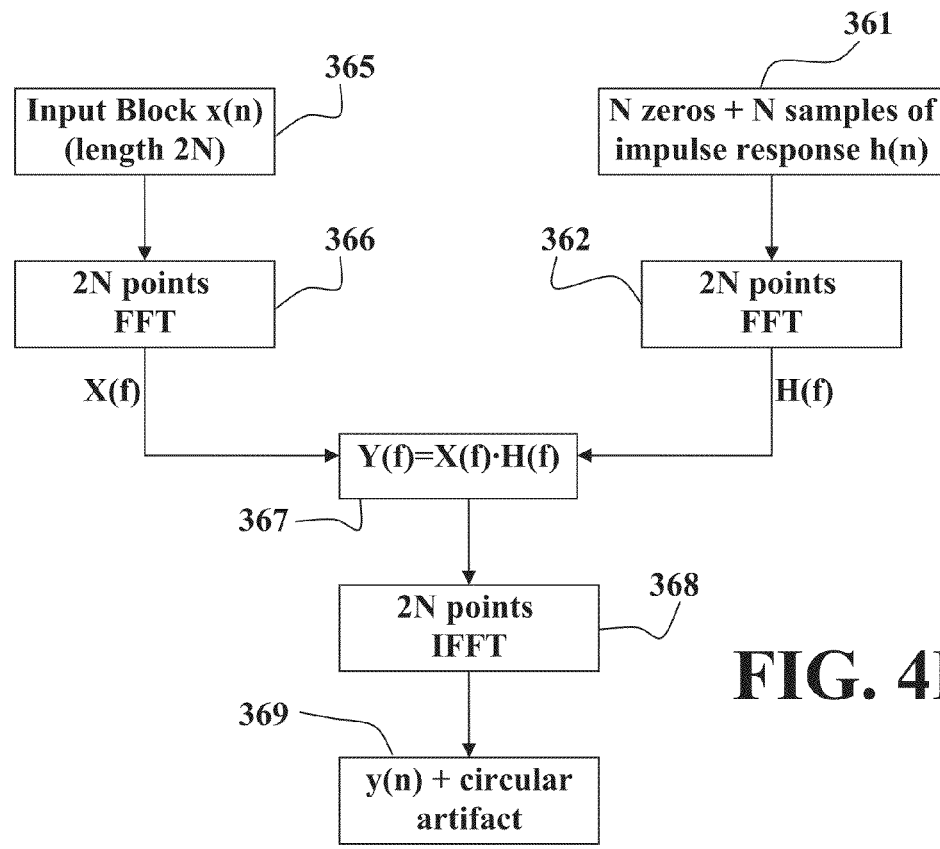
Figure 4B:
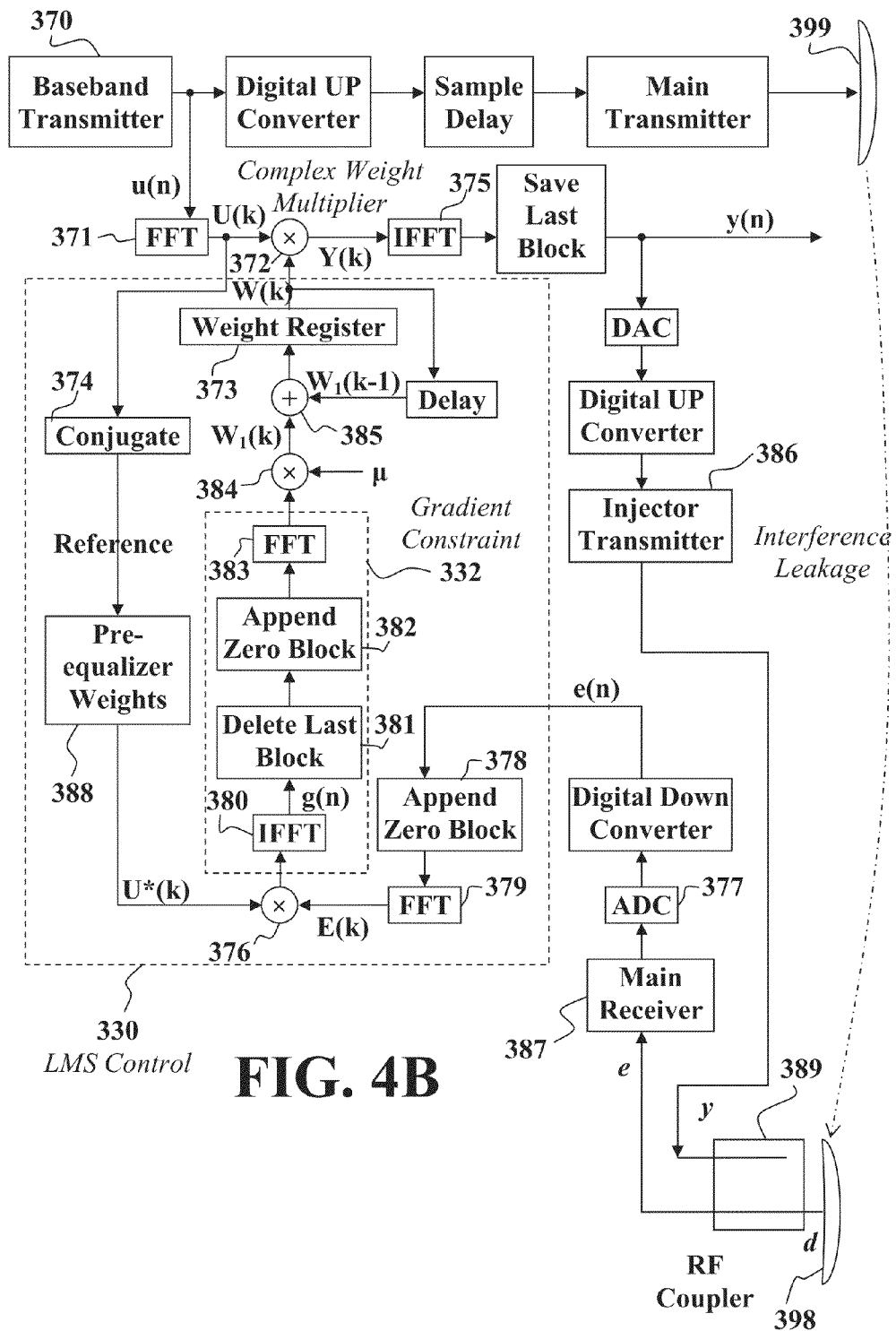

FIG. 4B schematically illustrates an exemplary embodiment of the LMS control loop of the present invention. In this example the injection branch (comprising injector transmitter 386 and coupler) is passed through analog and RF paths (between transmitter 370 and antenna 399), and the error signal e(n) is produced in RF (between antenna 398 and zero append block 378) and afterwards it is converted to digital domain at FFT block 379.

FIG. 4D demonstrates using the OLAS algorithm in frequency domain for calculating a cancellation signal, denoted as y(n) in this example. In this process 2N points frequency domain signals, X(f) and H(f), are computed for the input signal x(n), in steps 365 and 366, and for impulse response h(n) of the adaptive filter in steps 361 and 362. In step 367 the frequency domain signals are multiplied, and in step 368 the multiplication result is converted into the time domain. The time domain signal obtained in step 369 comprises N points of the calculated cancellation signal y(n), and N artifact points to be discarded.

Exemplary Error Calculation

With reference to FIG. 4B, exemplifying calculation of beamformer weights according to one embodiment of the present invention, an input block of time domain signal u(n) of size 2N to be transmitted from baseband transmitter 370 is taken, and the FFT of this block U(k)=FFT{u(n)} is calculated at 371. Next, filter output is computed by multiplying by complex weight multiplier 372 the FFT of the input block, U(k), by the filter coefficients W(k), as stored from the previous iteration in weight register 373. The multiplication result Y(k)=U(k)·W(k) (equivalent to convolution of the time domain signals) is transformed at 375 to the time domain by computing its IFFT, y(n)=IFFT {Y(k)}.

Due to circular convolution the first half of this result is simply discarded and the second half, $$y(n) = y\left(N + 1 \xrightarrow{upto} 2N\right),$$

forms the output of the adaptive filter for the given input block.

In an exemplary embodiment of the invention, the error signal is obtained in coupler 389, in which the RF cancellation signal y is subtracted from the RF received signal d, e=d−y, where d is a section of the received signal that corresponds to generated cancellation RF signal y. The error signal e is received by receiver 387 and then digitized at 377 and converted into the frequency domain by appending N zeros to it at 378 and computing its 2N point FFT at 379, thus calculating—E(k)=FFT{zeros,e(n)}.

The Gradient Constraint

In an exemplary embodiment of the invention, the gradient constrain implemented in blocks 380 to 383 is used to recover weight leakage occurring due to signal windowing. The conjugate U*(k) of U(k) produced at 374, used as a reference of a sample of transmitted data that is expected to leak through the air and interfere, is multiplied at 376 by the frequency domain error signal E(k), and the multiplication result is converted into the time domain by IFFT 380, thus obtaining g(n)=IFFT{E(k)·U*(k)}. The second half of this result is discarded at 381 due to circular convolution and due to the fact that the samples in the second half of the IFFT transformed signal are contaminated mostly from weight leakage noise.

Next, in block 382, N zeros are appended to the time domain signal, and the 2N point FFT of the resulting sequence is calculated at 383, the result of which is multiplied by μ (the step size parameter) at 384, thus obtaining $W_1(k)=\mu \cdot FFT\{g(n)\}$. This result is the filter coefficient update factor, $W_1(k)$, which is added at 385 to the previously computed update factor W(k−1), thereby updating the weight coefficients by calculating −W(k)=W(k−1)+$W_1(k)$.

These newly updated weight coefficients W(k) are then used as the filter coefficients to be multiplied at 372 with the next input block.

The Injector Pre-Equalizer Setting.

Due to unknown errors that may be introduced by the cancellation signal injector, which is implemented in RF/analog domain, in some exemplary embodiments of the present invention an injector pre-equalization unit is used as part of the primary analog loop for compensating the amplitude and phase variations of the frequency response of the RF/analog part of the injector (e.g., RF+IF unit 119 in FIG. 3B). The target of the pre-equalizer weights calculation is to set the pre-equalizer weights (388 in FIG. 4B). There are several methods to set the pre-equalizer weights, such as, for example:

Measuring the offline complex frequency response in complex form of the analog injector. The frequency response should be taken according to the frequency samples (bins) and the inverse of the measured frequency response is used as weights in the OLAS filter of the pre-equalizer.

Performing online calibration during periodic mutes using a convenient training signal. An example for convenient training signal are several OFDM symbols that guarantees that leakage is not introduced among the adjacent weights in the frequency domain. In this way the frequency response of the injector is measured by detecting the OFDM signals.

Figure 4C:
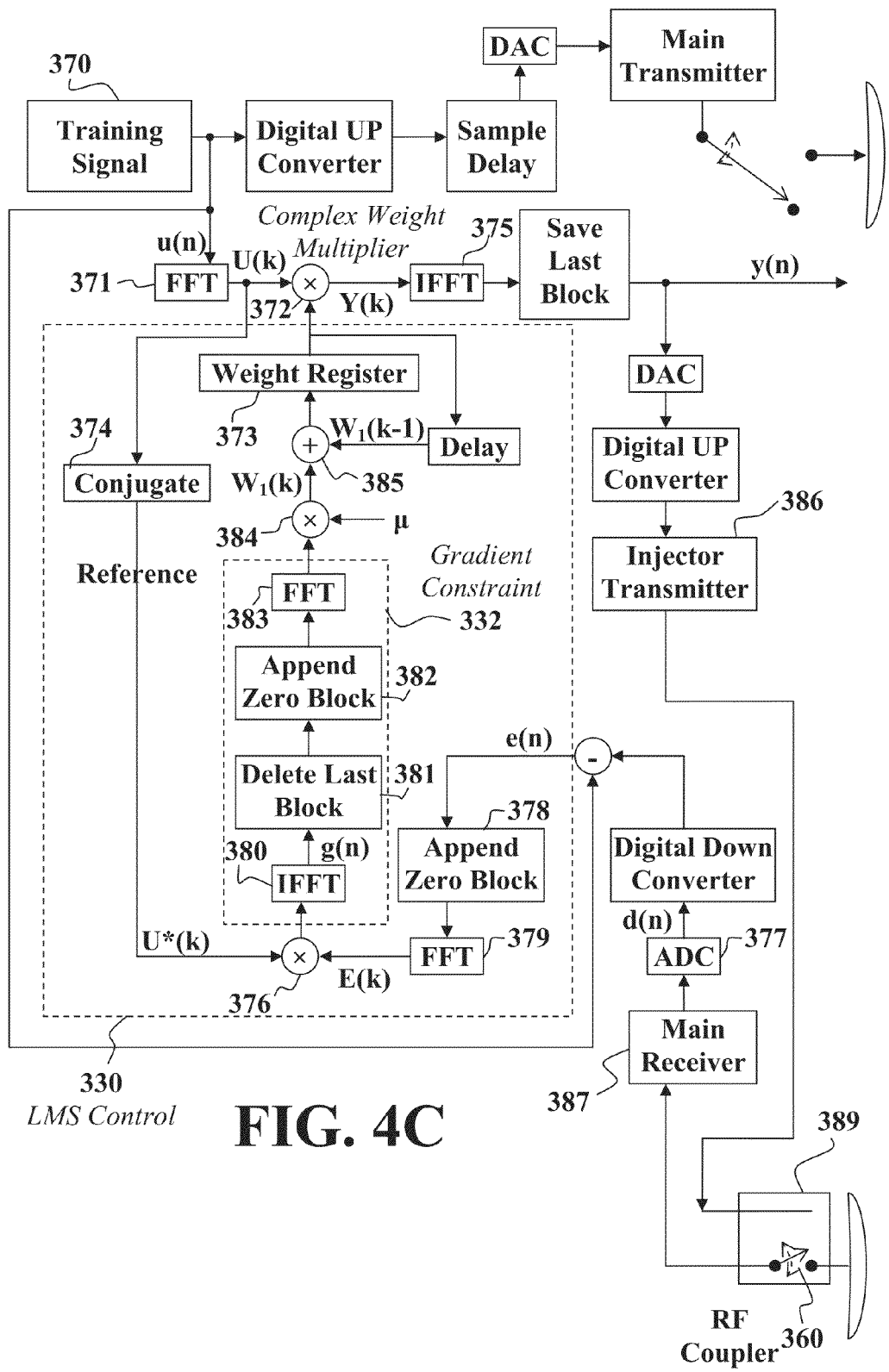

FIG. 4C schematically illustrates a possible LMS embodiment suitable for calculating the pre-equalizer weights (388 in FIG. 4B). As indicated at 360 the on air transmission may be muted in order to avoid any leakage, such that the only RF input signal to receiver 387 will be received from injector 386. Training signal 370 can be an OFDM signal, or any other broadband signal which bandwidth covers the calibration range. Running this loop will place the pre-equalizer weights in weight register 373. Since the dynamics of the RF response of the injector is very low, this loop can be activated in short intervals with low repetition.

The Direct Inversion (DI)—an Alternative Approach to LMS

The DI is an additional method for calculating weights. In the DI method a collect buffer is used to collect N samples from both reference and error signals in frequency domain. In the DI weights calculation method instead of calculating the weights with LMS, the calculation is done directly on a bulk of signal samples. For each set of weights w(k) the following calculation is carried out:

$$w_k(i+N:i+2N-1) = -\frac{\sum_{i=0}^{N-1}(r_k(i)-inj(i-N)w(i:i+N-1))e_k(i)^*}{\sum_{i=1}r_k(i)r_k(i)^*}$$

Figure 5:
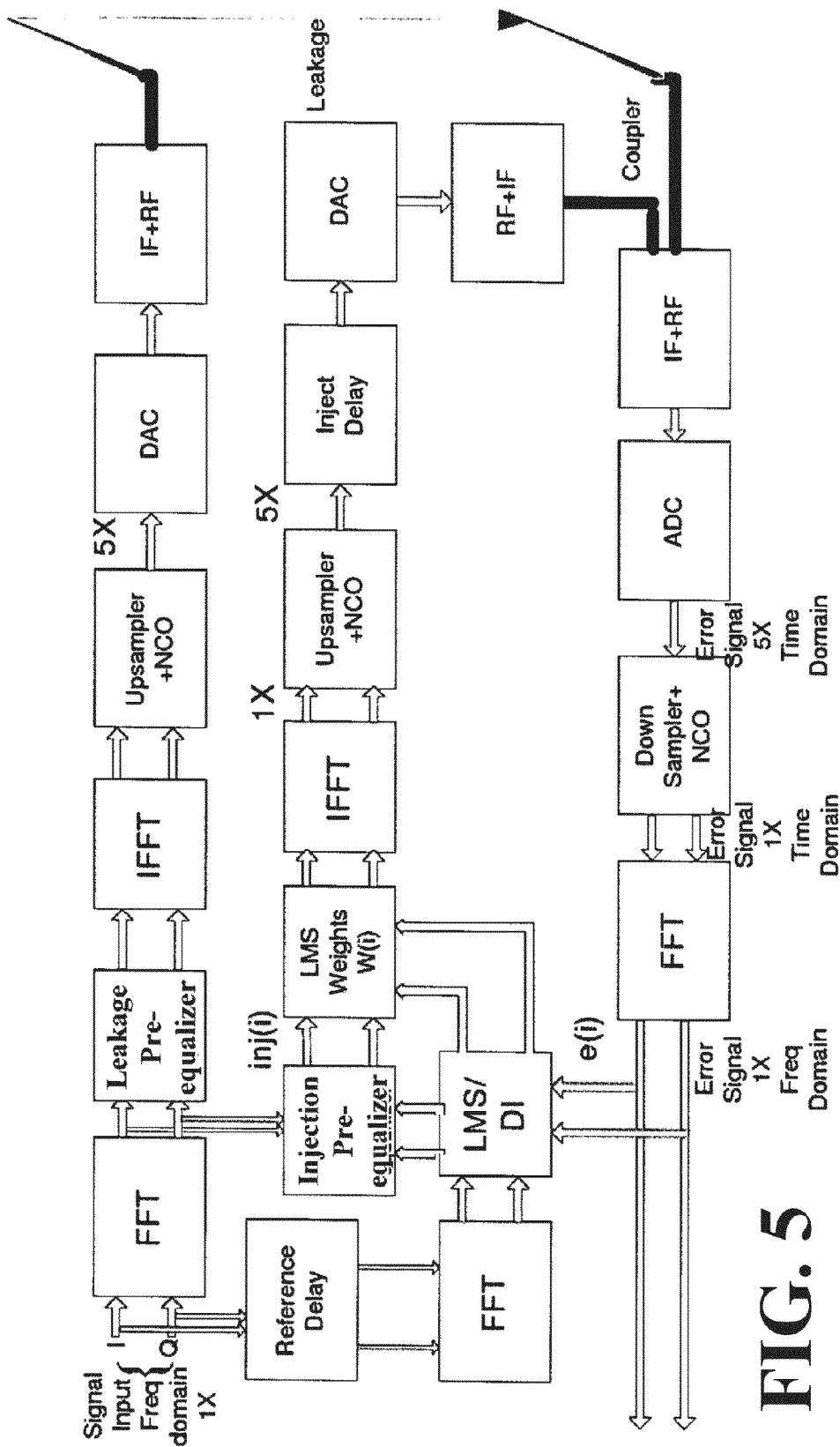
FIG. 5 is a block diagram schematically illustrating an exemplary direct inversion weight calculation implementation in accordance with some embodiments of the invention.

FIG. 5 schematically illustrates a possible LMS embodiment employing DI, wherein the weights are calculated in the LMS/DI block base on the above formula.

Interference Cancellation with MIMO Antennas

First Loops in Architecture with Multiple Antenna

In MIMO implementations in accordance with some embodiments of the present invention (wherein one, or both of the first transceiver and second transceiver, have multiple antennas for transmitting and receiving), assuming there are M transmitting antennas and N receiving antennas used in an exemplary transceiver, in the primary cancellation loop, there should be M×N injecting RF transmitters that cancels the leakage introduced from each of the M transmitting antennas in the transmitter in each of the N receiving antennas in the receiver. In an exemplary embodiment of the present invention only N injecting RF transmitters may be used, where all transmitters that transmit digital signals toward common Rx signal can be combined prior to converting them to the analog domain. In the secondary loop there will be for each input of the N demodulators M combiners that relates to M cancellation weights for both cancellation loops. In this way the costs of expensive RF circuitry may be saved by using separate branches from separate transmitters, and after weighting them, each with the appropriate weights, they are summated to become one signal to be used in a single RF injector.

The training signal should be orthogonal among the transmit antennas, e.g., different subcarrier group for each antenna in case of OFDM/OFDMA signal or training signal that will be toggled among the transmit antenna while the other antennas will be muted. This may be achieved by muting all the transmitters except to one transmitter in round robin fashion, for example. The reference leakage may be extracted for each receiving antenna from the signals to be transmitted from all of the transmitting antennas, and the complex beam former weights for both primary and secondary cancellation loops may be calculated out of matrix of M×N that represent the received reference signal with all Tx/Rx options.

Figure 6A:
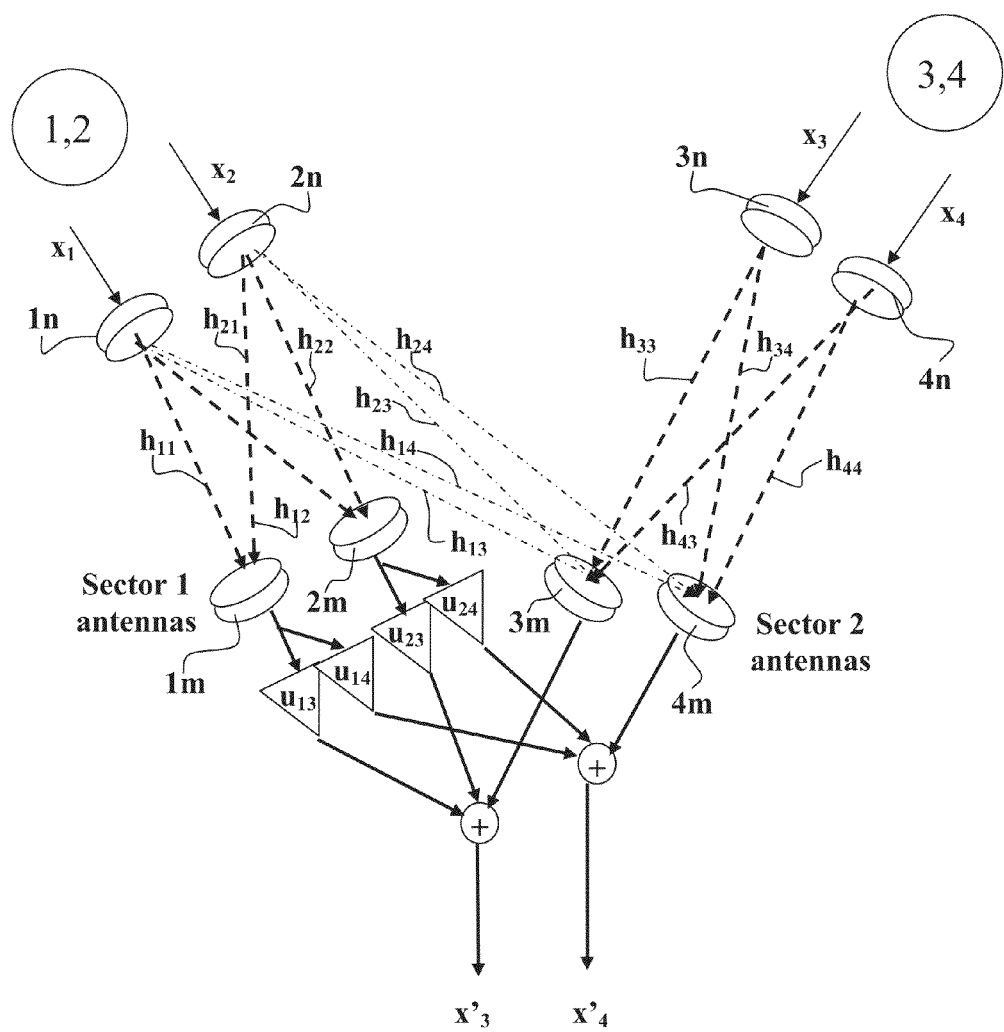
FIGS. 6A to 6C are block diagrams demonstrating interference cancellation in exemplary 2×2 MIMO architectures in accordance with some embodiments of the invention, wherein FIG. 6A exemplifies cancellation of antennas partial overlap interferences and FIGS. 6B and 6C exemplifies cancellation of self collocated receiver-transmitter interferences.
Figure 6B:
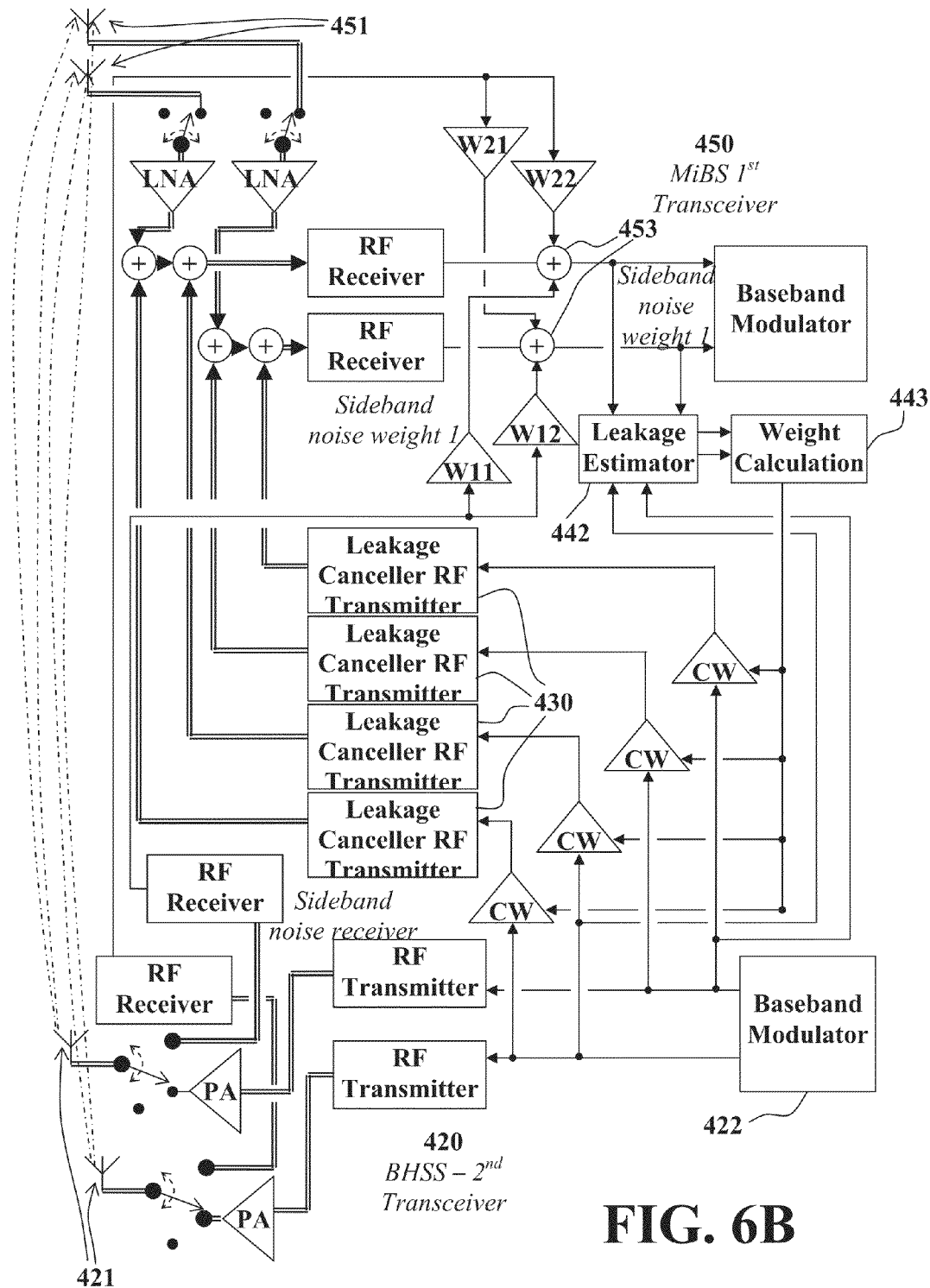

FIG. 6B schematically illustrates a possible embodiment of a primary cancellation loop from transceiver transmitter 420 to transceiver receiver 450, wherein each transceiver employs MIMO with two Tx/Rx antennas, 421 and 451 respectively. In one exemplary embodiment of the present invention the real payload samples from modulator 422 are used as inputs to the leakage estimator 442, instead of using the signal pilots, wherein the input payload samples from modulator 422 are correlated with each received MIMO transmitter baseband signal after the summation of the cancellation signal at 453. In this example the leakage estimator 442 and weight calculation 443 units optionally computes for both the primary and the secondary loops.

In this example, leakage estimator and weight calculator are used to process the received interfered signal in the frequency domain, and adjust two complex weights for each receiving antenna. The complex weights are used as scaling factors of the transmitted signal from the baseband modulator and provided to the leakage cancelling units 430. Each leakage cancelling unit 430 generates a respective RF interference cancellation signal summated in the receiver's RF path to cancel the interference.

Figure 6C:
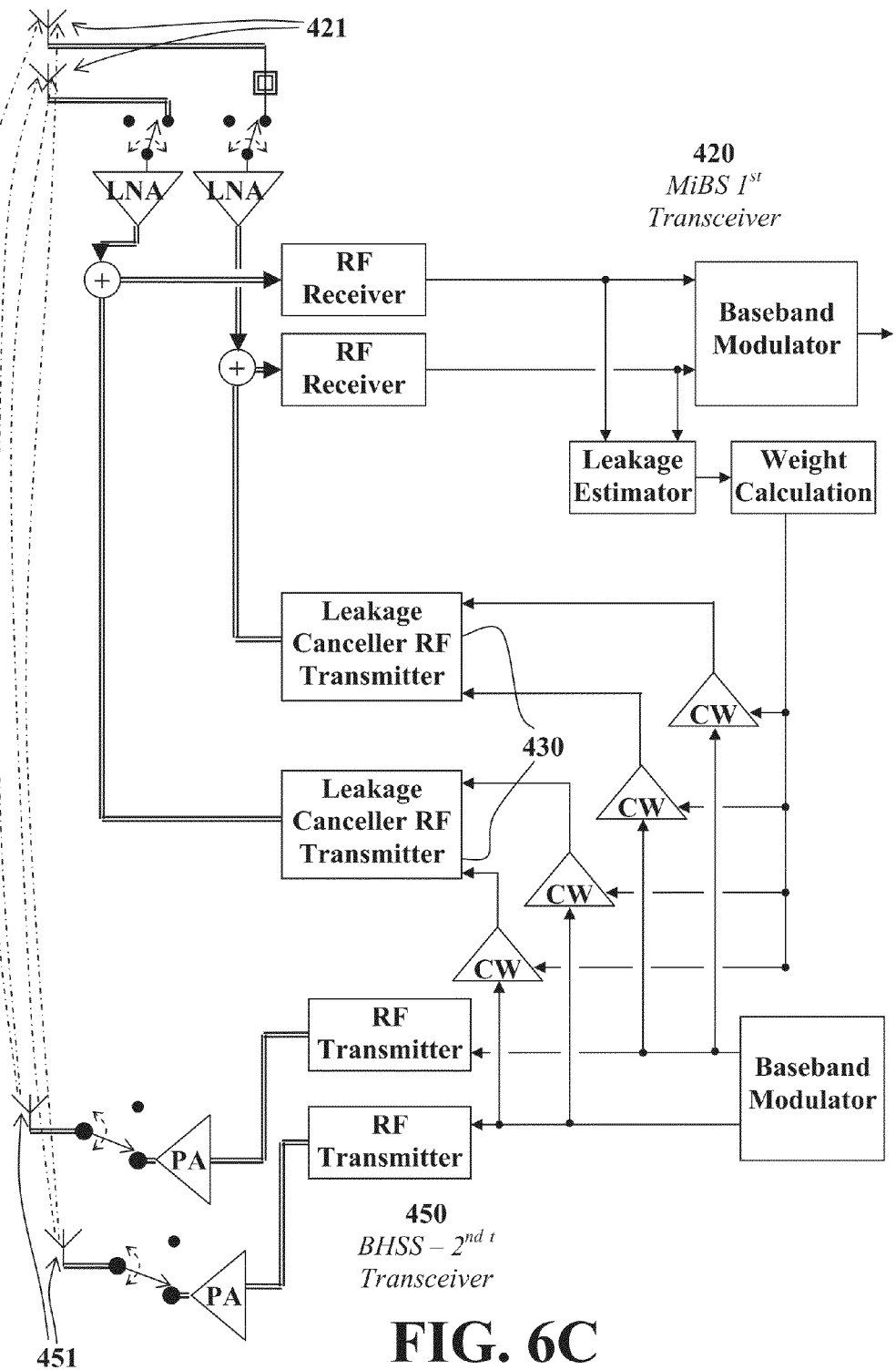

In another possible embodiment wherein it is desired to reduce HW costs, a single analog canceller from two transmitters to one receiver can be used, by combining the leakage cancelling unit of each receiving antenna (prior to conversion into analog signal domain), and by carrying a single analog leakage injection branch toward each receiving port to be combined with the signal received in each antenna, as exemplified in FIG. 6C.

Secondary Digital Loop

Figure 7:
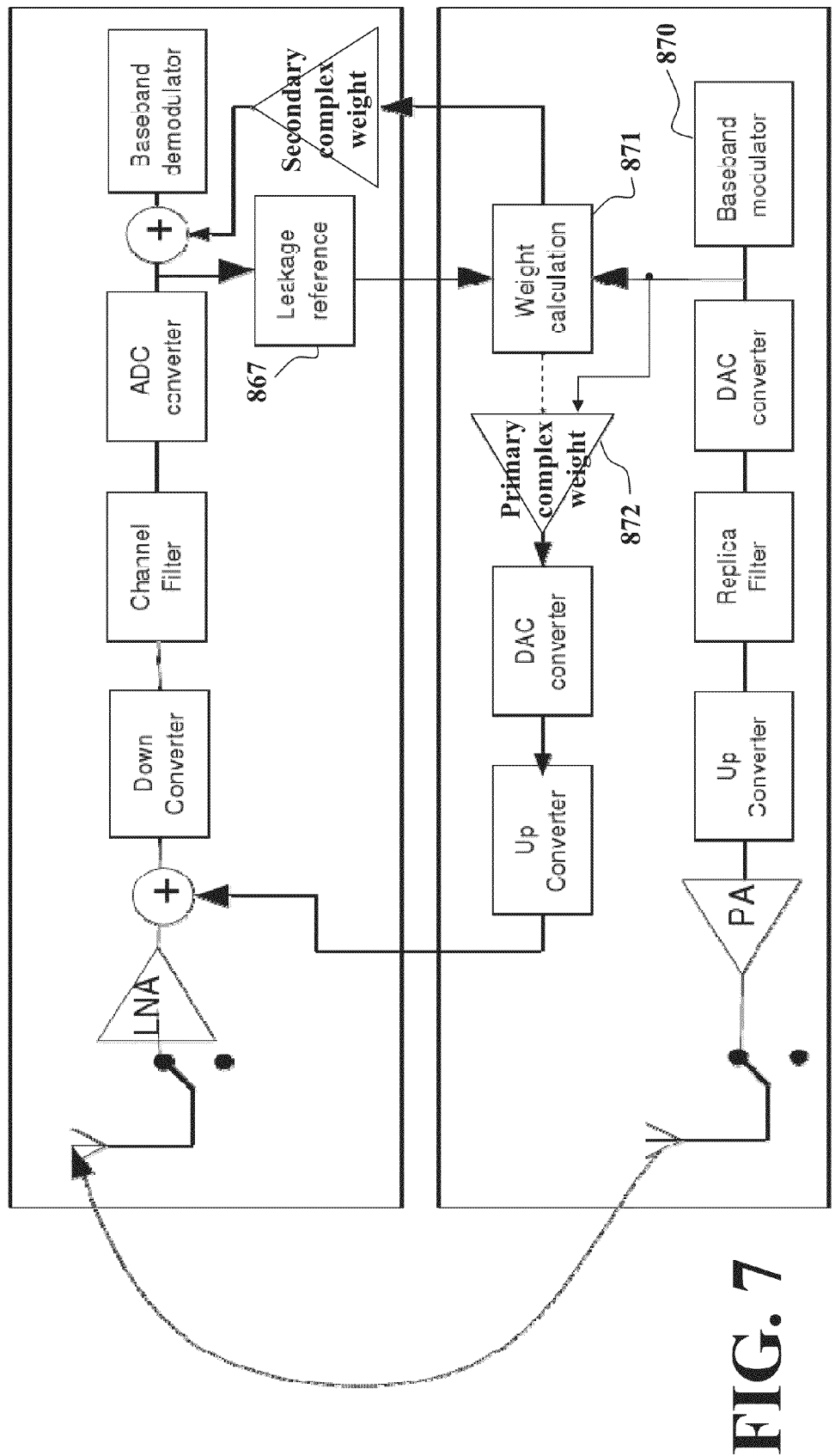
FIG. 7 is a block diagram schematically illustrating an exemplary leakage cancellation with primary and secondary weights architecture in accordance with some embodiments of the invention.

In an exemplary embodiment of the present invention, the secondary loop is conducted completely in the digital domain. With reference to FIG. 7, in this example the reference signal is the digital modulated signal generated by the interferer digital modulator at 870. This reference modulator from 870 is multiplied at 872 by a matching complex weight calculated by weight calculation 871 to cancel the outband transmitter noise ingredient that remains after the primary cancellation, as indicated by leakage reference block 867. The weights may be calculated at 871 using LMS algorithm that correlates the residual error provided from block 867 with the reference from block 870. This residual error can exist, for example, due to errors in the analog path resulting from uncompensated injector. Delay differences may be cancelled in the LMS loop (e.g., see FIGS. 4A-B), and in the combining process, for example, by means of the LMS delay compensating loop.

Tx Outband Noise Loop

As opposed to the first and second loops, the source of error that is caused by the transmitter Tx outband noise cannot generally be estimated from the transmitted baseband signal. The reference for the cancellation of such Tx outband noise is optionally taken by sampling the noise of the transmitter by a receiver chain that is tuned to the same frequency of the main receiver, and digitally injecting a corresponding interference cancelling signal to the receiver baseband in order to cancel this same noise that enter the receiver.

Figure 8A:
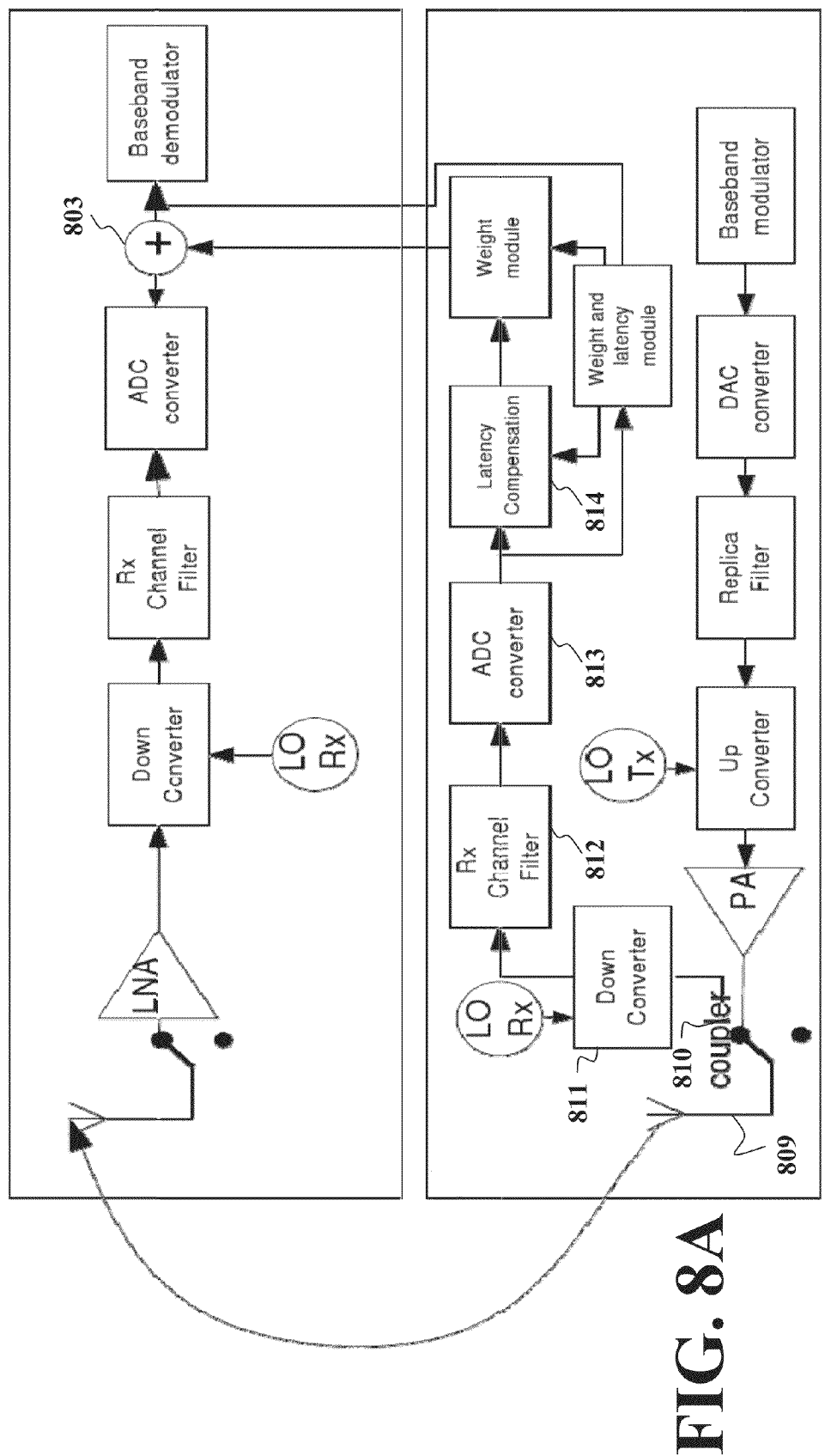
FIGS. 8A and 8B are block diagrams schematically illustrating exemplary embodiments of transmitter outband noise loop cancellation in accordance with some embodiments of the invention.

For example, with reference to FIG. 8A, in exemplary embodiments of the invention, the transmitter noise may be sampled using coupler 810 at the transmitter antenna 809, by filtering the transmitter channel from the signal obtained by filter 812, and sampling the filtered signal by ADC 813. The LO Rx/Tx inputs provided to converter units in FIG. 8A are used for frequency shifting to sample outband frequency. In order to implement this loop the latency of the injecting brunch is optionally matched at 814 with the latency of the leakage signal to be cancelled that is coming via the leakage path, and the signal at adder 803 should be time matched in order to achieve the desired interference cancellation. The latency loop can be extracted from the primary and secondary loops.

The weights calculation is LMS based, and may be carried out as described in details hereinabove.

Figure 8B:
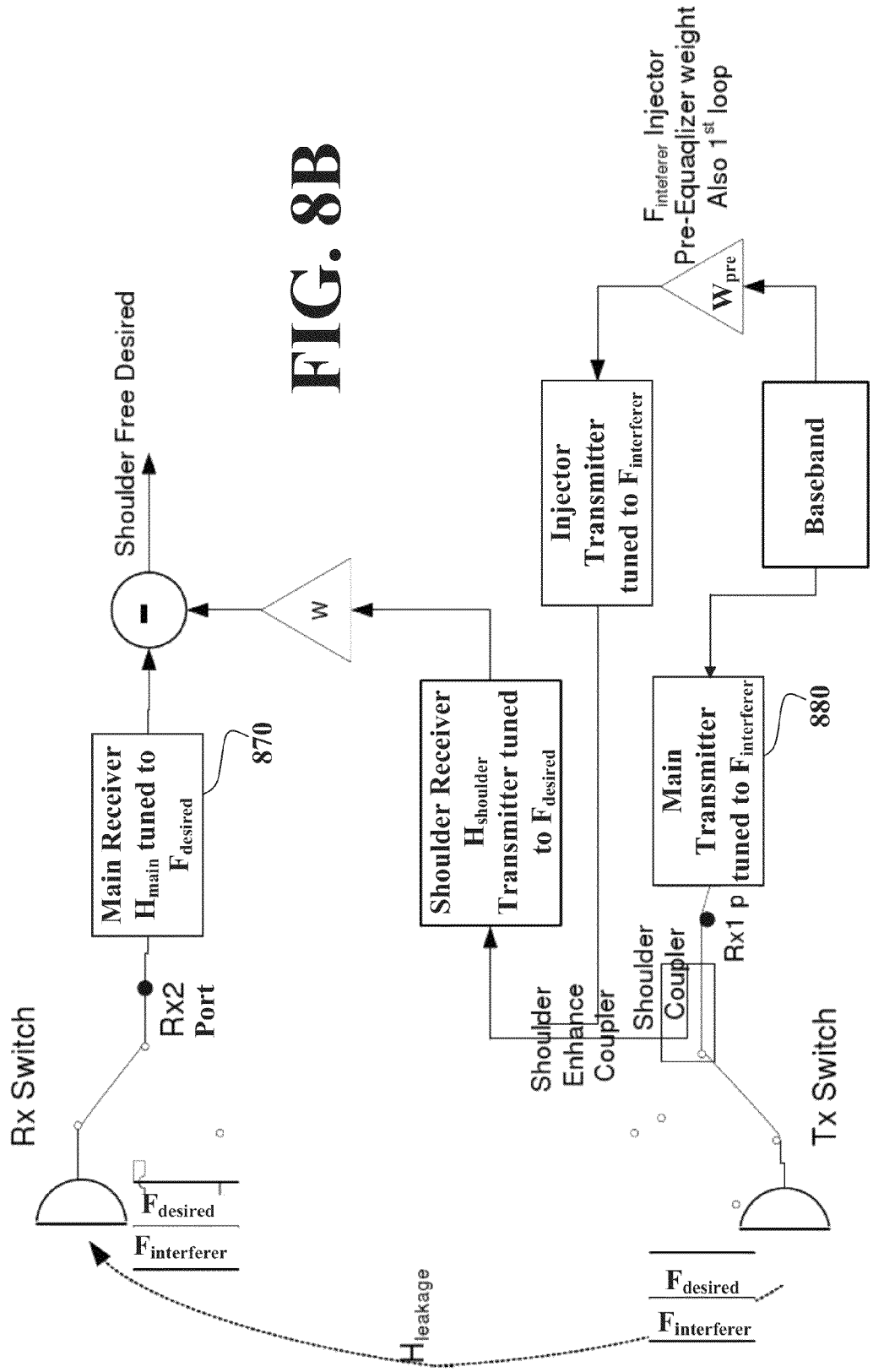

With reference to FIG. 8B, exemplifying a possible outer band loop cancellation implementation according to an exemplary embodiment of the present invention. Receiver 870 may be tuned to $F_{desired}$ and interfering transmitter 880 may be tuned to $F_{interferer}$, which can be adjacent to $F_{desired}$ or close to it. The outskirt or shoulder of the transmission mask (i.e., the transmitter illinearity that results in out-of-band outout noise) is leaked to the receiver. Thus, the shoulder obtained in signals received in receiver 870 is tuned to the shoulder channel of the main transmitter 880.

In order to enhance the sampling of the shoulder on account of the center bandwidth transmission the same injector of the primary loop may be incorporated in order to attenuate the strong center transmission. More particularly, when the shoulder in transmission from transmitter 880 is sampled, the center signal of the transmitter, which is of high amplitude, is spoiling the shoulder measurement since it is high and adjacent, so it cannot be filtered in good manner. However, the center signal can be attenuated by injecting RF signal that is adapted to cancel it, as done in the primary cancellation loop.

Antenna Beam Former Loop

Figure 9:
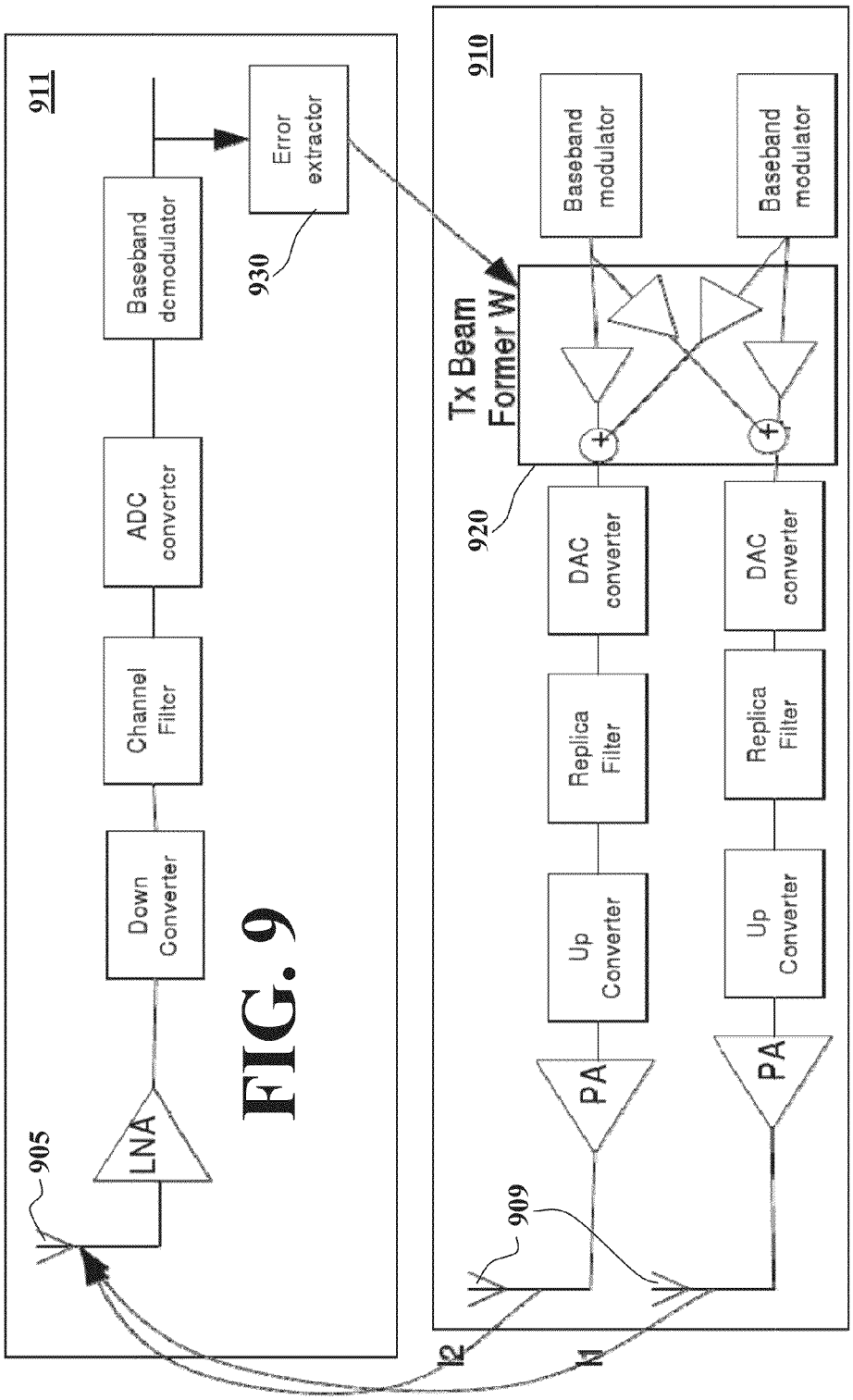
FIG. 9 is a block diagram schematically illustrating an antenna beam former loop according to some embodiments of the invention.

FIG. 9 schematically illustrates a beam former loop according to an exemplary embodiment of the present invention. In this embodiment it is proposed to incorporate antenna array 909 in the First Transceiver transmitter 910. In case of single input single output (SISO) antenna 905 in the Second transceiver 911, two leakage paths 11 and 12 are typically present. With the aid of beam former weights 920 beam former loop may be configured such that the amplitude of interference leakage 11 will be close to the amplitude of interference leakage 12, and having the opposite phase, which will reduce the composite leakage. In this example, to enable interference cancellation, the leakage signal is monitored at error extractor 930 in the receiver path, and complex beam former weights are calculated using a known algorithm, such as, but not limited to, LMS, RLS or direct matrix inversion, until a minimal leakage power is sensed at error extractor 930. This beam former loop can be employed in the BHSS transceiver transmitter assuming it does not incorporate a MIMO configuration.

In an exemplary embodiment of the invention, in the case of dual antenna array 909, the beam former 920 can only steer null toward the receiving antenna 905 without any control of the composite antenna pattern. In another exemplary embodiment of the present invention a third antenna may be added at 909 (not shown) with triple weight beam former in order to steer the composite beam toward the MaBS 911 concurrently with steering null toward the receiving antenna 905 of the second transceiver 911. Since the signal is of the same origin there will be no requirements for two analog cancellation paths ($1^{st}$ loop), such that only a single analog path is needed for cancelling the composite signal leakage out of the two transmitting antennas 909.

In case of TDD, where the channel is reciprocated, the null that is steered in the direction from the first transceiver transmitting antenna 909 toward the second transceiver receiving antenna 905 is the same for the other direction, namely, from the second transceiver transmitting antenna 905 to the first transceiver receiving antenna 909. In order to calculate the weights from the receiving direction to the transmitting direction (i.e., to determined the DL weights from the UL weights) a calibration scheme may be employed in exemplary embodiments of the invention in order to calculate the coefficients that will compensate the difference of Tx and Rx hardware response (e.g., as described below in the section "Transmitter Weights Are Calculated From Receiver Weights"). This calibration scheme is needed since the RF chains of the transmitter 910 and of the receiver 911 are not identical. The channel is assumed here to be identical as TDD is used.

Beam Selection Loop

Beam selection loop may be utilized when the backhaul transceiver is using a type of multi-beam antenna assembly incorporated with beam selection switch that selects transmitting antennas according to the optimal performance communication link toward the MaBS. Exemplary embodiments of the present invention may comprise a loop control which monitors the leakage power in the second transceiver's receiver and select the beam that will exhibit the minimum leakage power as long as backhaul communication with the MaBS using those antennas has sufficient quality. For example, the monitoring may be carried out employing toggling beams in round robin fashion to search for the minimum error in the received signal. Due to channel reciprocity this beam selection will be the same for the other direction from the Second transceiver transmitter to the first transceiver receiver.

The Power Control Loop

Interference cancellation loops of the present invention, in some embodiments thereof, may still experience remaining residuals of leakage that will hamper the quality of the receiver. These residuals phenomena will be aggravated in the case that the interferer shares the same channel with the receiver. In order to improve the quality of the reception in exemplary embodiments of the invention an additional loop may be employed for setting the maximum power of the transmitter according to the leakage power or error vector magnitude (EVM) of the receiver. For example the power of the interferer may be lowered by monitoring the received error (EVM) until a sufficient working point is reached.

The Training Process

The training process described below is aimed at setting the weights of the cancellation loops. It is note that this training process may be also used in case there is only one receiving antenna.

There are two concepts for training. One is that every transmitter transmits concurrently and periodically a short training sequence known to the receivers that is orthogonal to the other training sequences of the other transmitters. The other concepts is that periodically one transmitter is muted for short intervals while the others keep on transmitting normal data. This scheme repeats itself for each transmitter in round robin fashion.

In both concepts the receivers on the other side are synchronized and aware exactly when there is a muring interval or training signal transmitted. This method can be usually implemented in TDD when the interfering transmitter is transmitting only part of the time. The other method does not utilize a dedicate pattern in the transmitted training data, but rather utilizes the normal payload data which is known to the receiver, as the training signal, assuming no correlation occurs between the interfering data and the desired data that the receiver is targeted to detect. In the second method when the cancellation circuit is tuned to the transmitter frequency (like in the $1^{st}$ cancellation loop), and when this frequency is different from the receiving frequency of the desired signal, there may be required a second receiver, attached to the receiving antenna, that will be tuned to the transmitter signal.

In one possible embodiment of the present invention a training process is used in the primary loop. However, this training process can be used by all interference cancellation loops of the present invention. Optionally, the training process is performed periodically during time intervals in which neither the transmitter nor the receiver are used for normal operation. For example, such time intervals may be during the TDD gap between the transmitting and Receiving sub-frames in the Second transceiver and the first transceiver respectively.

In an exemplary embodiment of the present invention a dedicated symbol or dedicated symbols may be used periodically. During this dedicated symbol or symbols period both the first transceiver and the second transceiver will not transmit normal network payload data, and instead each will use in its own transmit sub-frame to transmit the training data. In case of multiple antennas, if the network is OFDM or OFDMA based, the training signal may employ a separate subcarrier group for each transmitting antenna.

In exemplary embodiments of the present invention the subcarriers are decimated in integer factor, which will shorten the training OFDM/OFDMA symbol as compared to normal OFDM/OFDMA symbol. Optionally, only part of the subcarriers are used, which are in subsections having large gap between each. Since the training is mostly stationary a sufficient averaging process can be incorporated for minimum error in the weight calculation (i.e., the process will be repetitive to enable averaging).

In yet other exemplary embodiments of the present invention the training process utilizes existing preamble or midamble of the second transceiver or the first transceiver (e.g., in wiMAX and LTE implementations). This preamble (or midamble) is usually unique to the transmitter by CDMA or PRBS modulation, such that after the averaging process it may be employed for the training process. Since the training is stationary it may be assumed to have good orthogonality and can be used by the proposed dual cancellation.

In still yet other exemplary embodiments of the present invention the transmitters of the secondary loop and of the primary loop may use the same channel, such that in case of single input single output (SISO) system, there is no need to use special training sequence, and there is also no need to use pilots. The weights may be calculated by the normal data that both second transceiver and first transceiver transmit. With this method the Second transceiver receiver may receive from the MaBS during the training process the signal that is being transmitted by the BHSS First transceiver, and the MiBS second transceiver receives during the training sequence the signal transmitted from the First transceiver as it serve SSs in the uplink.

As the two signals; the signal from both the MaBS and from the first transceiver in the case of the second transceiver receiver, are both randomly independent, they are hence also orthogonal (this is also the case when the UL and the backhaul reception are not correlated e.g., when the signals from both first transceiver and UL served SS are not correlated). The orthogonality of the two signals enables to learn the training also in the presence of the other signal, taking into account that given that the scenario is mostly stationary sufficient averaging duration will eliminate completely the affect of the desired signal during the learning of the interfering signal.

In this exemplary embodiment, in case of multiple antennas, the payload data cannot be used since both antennas transmit different payloads that are mixed together. In this case it can be assumed that within the payload symbols there is an embedded group of known pilots (e.g., as in WiMAX DL and UL) for the channel estimation process. It can be further assumed that in the multiple antennas process, different pilots can be used for each antenna of the multiple antennas. In this embodiment the training learning of the interfering signal is learned concurrently with the receiving of the desired signal. The assumption is that the pilots of the desired signal are modulated in different pseudo random scheme, which makes the training pilots practically orthogonal for large averaging process of the cancellation process. These pilots will be used as training sequence in order to set the cancellation weights.

In an exemplary embodiment of the invention, the training process is carefully carried out to prevent receiver saturation during the training process. Optionally, in order to guarantee that the receiver will not be saturated or compressed (if the training signals have strong power they may compress the receiver and then they become useless), the training symbols should be transmitted at lower power. Lowering the power is desirably done in baseband (it can be done by lowering the complex weights) in order to guarantee that there is no change in the RF and analog circuits during the training period as compared to the normal mode.

In an exemplary embodiment of the present invention, in cases when there is no correlation among the signals that are transmitted at each of the MIMO antenna, there will be no need for pilots. Each of the baseband payload signals will be sampled as a reference signal and will be correlated with error signal at each Rx input MIMO antenna. With this correlation a unique coefficient set will be calculated used for cancellation of the leakage component from a pertinent transmitter to a pertinent receiver antenna.

The Cancellation Circuit
Primary Cancellation:

As was mentioned hereinabove, an additional injection path may be employed to cancel the leakage path. One of the issues requiring consideration is the group delay variation between the leakage path and the injection path. In case of OFDM/OFDMA the group delay variation is compensated by issuing training symbols or sampled data symbol with narrow bandwidth (BW) sub-carriers (i.e., by calculating weights for each subcarrier) as OFDM subcarriers, and calculating different cancellation weight corresponding to each sub-carrier. In another exemplary embodiment of the invention the sub-carriers bins are not OFDM/OFDMA signals type but rather of OLAS/WOLA filter bin type after the FFT. In this regard symbol means OLAS/WOLA frequency domain block and N is the number of frequency bins in the WOLA/OLAS block. It is expected that the average group delay will be around zero in order to clean maximum of the symbol interval from interference. This can be achieved with delay lines in the injection path, while the average delay error can be measured by the average phase slope of the weights along the frequency (delay in frequency domain cause phase slope versus frequency the delay can be measured by measuring this slope), and can be compensated with separate control loop.

Figure 11:
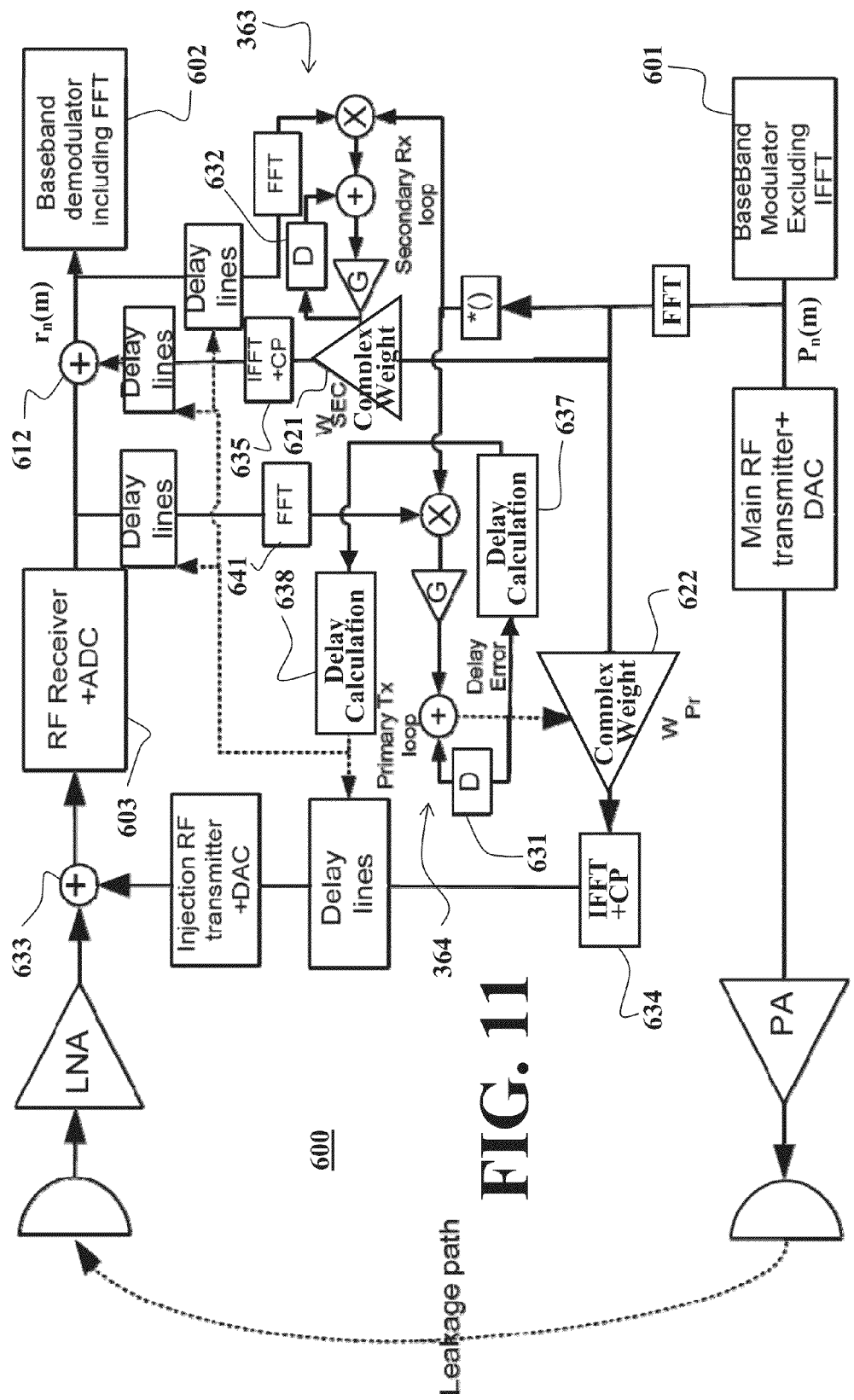
FIG. 11 is a block diagram schematically illustrating an exemplary cancellation configuration in accordance with some embodiments of the invention.

It should be noted that the network synchronization provide certain stability to symbol frequency and the correction may be also done in the symbol phase. FIG. 11 schematically illustrates one possible embodiment of such a cancellation circuit 600. It is assumed in FIG. 11 that modulator 601 issues the modulated signal $p_n$, which can be either a sub-carrier of a training signal, or real data signal, based on the particular implementation used, in the frequency domain (prior to the IFFT), that demodulator 602 is receiving the signal summated at 612 in time domain, and that demodulator 602 includes FFT functionality. The complex weights in the two loops, 621 and 622, are in the frequency domain, and only after adjusting the frequency domain signal $p_n$ by complex weights 621 and 622, and prior to their summations at 612 and 633, the signals are transformed to time domain by issuing IFFT and adding the cyclic prefix (CP) at 634 and 635. The delay compensations calculated at 637 and 638 should be in both digital and analog injection branches, and also for both signals that issued by the LMS control loops 363 and 364 (in order for the LMS inputs to be time matched)

In one exemplary embodiment of the invention the modulator 601 sends during frame No. m training/sampling period sub-carriers $P_n(m)$, or just payload signal in another exemplary embodiment, wherein n=1 to N is the serial number of the sub-carrier symbol in the training symbol. The cancellation loop performs here FFT at 641 on the signal received from receiver 603. Optionally, the cancellation loop may use the FFT functionality of the baseband demodulator 602. The LMS circuitry calculates values for canceling $r_n(m)$, which is the received subcarrier that corresponds to transmitted sub-carrier during training or sampling period, wherein n is an integer indicating a serial number of a sub-carrier in the training/data symbol (n=1, 2, 3, . . . , N, where N is the number of sub-carriers in training/data symbol), and m is an integer value indicating a serial number of a frame.

As discussed hereinabove, instead of performing the cancellation in OFDM/OFDMA using the original subcarriers, the same calculation can be carried out using a WOLA or OLAS filter, which can use arbitrary window interval converting the time domain signal using FFT, such that instead of calculating weights for subcarriers the weights calculation may be done on the FFT terms. In FIG. 11 the FFT and IFFT can be regarded as part of the OLA/OLAS process.

Equation 1 below formulates the LMS loop calculation of the Tx weights, wherein:

$W^{Tx}_n(m)$ denotes a Tx complex weight that corresponds to subcarrier n of frame m;

$P_n(m)$ denotes modulation of sub-carrier n of frame m; and $r_n(m)$ denotes modulation of training subcarrier n of frame m Please look at;

N is the number of subcarriers in symbol; and

G denotes the loop gain which sets the averaging amount value.

Primary weight equation  Equation 1

$$W_n^{Tx}(m+1) = W_n^{Tx}(m) + G\frac{r_n(m)P_n^*(m)}{|r_n(m)||P_n(m)|}$$

Equation 2 formulates the loop calculation that sets the delay line in order to compensate the delay between the paths, wherein:

$\tau_{err}$ denotes the delay error between leakage and injection path; and $\tau$ denotes Current delay setting of the delay line.

The delay compensation equation  Equation 2

$$\tau_{err}(m) = \frac{\Delta f}{2\pi}\sum_{n=2}^{N}\frac{(\text{angle}(W_n^{Tx}(m)) - \text{angle}(W_n^{Tx}(m)))}{N-1}$$

$$\tau(m+1) = \tau(m) - G\tau_{err}(m)$$

Secondary Cancellation

The secondary cancellation circuit is purely digital implemented loop that may cancel the residual left interference after the Tx primary loop has been executed. This cancellation is implemented prior to the Rx demodulation. The loop optionally uses the same training reference and process as described hereinabove.

$r^{Tx}_n(m)$ denotes modulation of training subcarrier n after primary cancellation of frame m. (see FIG. 11).

$$W_n^{Rx}(m+1) = W_n^{Rx}(m) + G\frac{z_n(m)P_n^*(m)}{|z_n(m)||P_n(m)|}$$

Outband Transmitter Noise Cancellation

As discussed hereinabove, the reference signal for noise cancellation is not always the transmitted baseband data as in the various interference cancellation loops described hereinabove. In case of Outband transmitter loop noise the reference is the actual noise that is sampled by the dedicated receiver as was described hereinabove. The weight equation is practically the same as above but for the noise cancellation loop P(m) denotes the baseband value of the sampled transmitter noise.

Some of the various embodiments of the present invention described hereinabove enable various wireless applications where simultaneous transmission and reception of signal within the frequency band, is desired using collocated low isolation antenna installation. Exemplary implementations of these embodiments include, but not limited to, in-band backhaul/Relaying where a small scale base-station and a backhaul subscriber-like entity are collocated and apply to an opposite duplexing regime. Other applications include, inter alia, uncoordinated transceivers with antenna collocation, full-duplex and sector full frequency reuse, and Ad-Hoc Mesh Networks, in all these cases a scenario where interference between transmission and reception is created, some embodiments enables to continue high-performance operation by cancellation of the resulting interference.

The present invention, in some embodiments thereof thus enables collocated transceivers to concurrently transmit and receive signals without masking each other. For example, in a relay base-station, or access-point with an embedded in-band wireless backhaul that communicates a remote macro base station or backhaul feeder, which may require two or more transceivers (each communicating using it own antenna to communicate separate peers). Typically, the antennas are positioned in close proximity and are using the same frequency band, or different frequency bands, in the same spectral block, and thus suffer from self and signal leakage interferences.

Cancellation Of Antennas Partial Overlap Interferences

FIG. 1A schematically illustrates an exemplary LTE backhaul transmission network 10 having a wired network core 11 coupled to one or more antennas 11t which communicate through relay BSs 12a and 12b and through eNodeBS relays 13a and 13b with subscriber stations 14. Interference may occur in such configurations, inter alia, when either, the interferer transmitter antenna boresight is steered toward the interfered receiving antenna, or when the interfered receiving antenna boresight is steered toward the interferer transmitting antenna.

In general, as will be exemplified hereinbelow, an arbitrary transmitting hub having N antennas may introduce a maximum of N−1 interferers to each of the spoke receivers, and vice versa, a receiving hub having N antennas may face interference from maximum N−1 spoke transmitters. In order to cancel N−1 interferences at least N receiving antennas will be needed, as exemplified in some of the embodiments of the present invention discussed hereinbelow. In addition, in order to cancel N−1 interferers without hampering the desired signal at least N+1 receiving antennas will be needed.

The present invention in some embodiments thereof may be employed to achieve reduced degree of freedom of N receiving antennas (rather than N+1) due to the use of directional antennas, each steering its boresight to different direction angle while maintaining the level of overlap between the antenna lobes bounded (steering N−1 nulls requires N antennas, while steering N−1 nulls and maximum beam to desired signal N+1 antennas need to point beam toward desired remote terminal). In case of only N antennas null can be steered with no guarantee what will be the reception of the desired signal. In case of partial overlap antenna lobes this degradation in most of the time will be marginal if at all. As such, with partial overlap lobes only N antennas are needed in order to cancel N−1 interferers.

In exemplary embodiments of the present invention each PTP link has dual direction communication, operating in either half or full duplex. In the case of full duplex PTP link communication, the supported duplexing mode is either time-division duplexing (TDD) or frequency-division duplexing (FDD). Some interference cancellation embodiments of the present invention will be described hereinbelow in OFDM implementations. It is however noted that the invention is not limited to such implementations, and that the invention can be implemented also in other implementations, for example, employing single carrier transceivers.

The interference cancellation techniques of some embodiments of the present invention can improve frequency reuse in radio communication systems employing several point to point (PTP) links sharing the same tower. In possible embodiments of the present invention all of the terminals in the tower can be embedded into one hub unit. Embodiments of the present invention may be used for cross lobe interference cancellation (CLIC), which allows all PTP links to share the same frequency channel, or alternatively use adjacent frequency channels. In some embodiments of the present invention the interference cancellation may be employed for mutual co channel and adjacent channel interference rejection, which may be achieved using signal processing techniques.

Implementations of embodiments the present invention allows operating network hub transceivers with significantly low frequency reuse, up to the case wherein the transceivers utilize a single common frequency channel (aka frequency reuse 1).

While some embodiments of the present invention exemplified herein relate to the case of a two transceiver hub, it should be clear that these embodiments are provided herein by way of example, and that the embodiments of the present invention may be implemented in systems comprising numerous transceivers.

It is further noted that some embodiments of the present invention may be implemented in a hybrid fashion, where the loop control and the cancellation are implemented digitally.

Figure 2A:
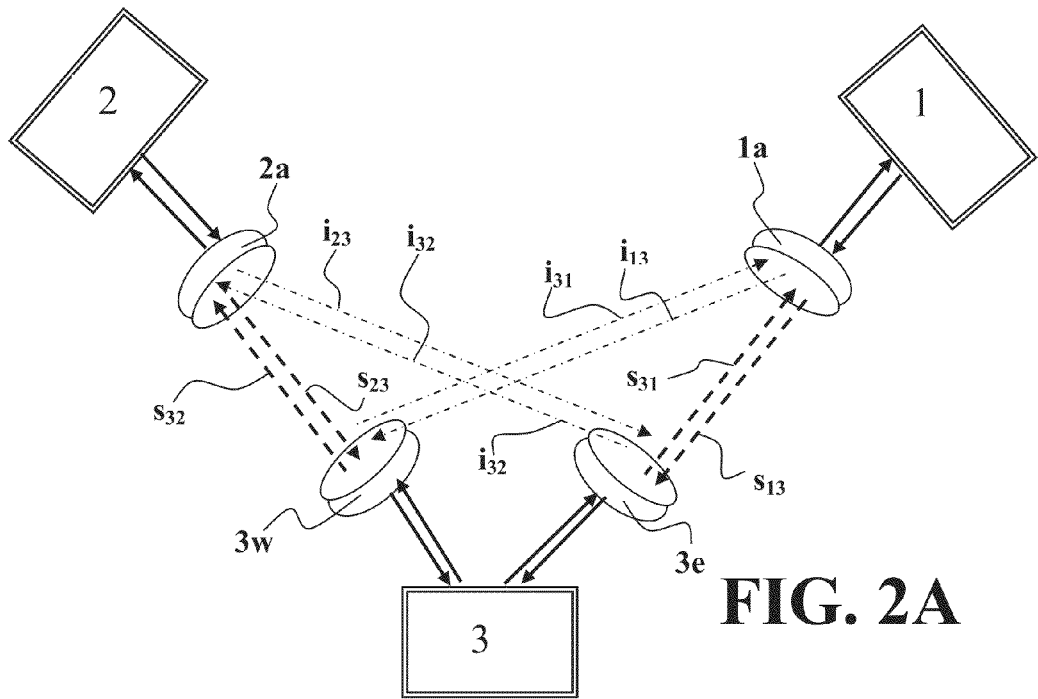
FIGS. 2A to 2E schematically illustrate adjacent channel interference in point-to-point hub and spoke networks and methods of cancelling them in accordance with some embodiments of the invention, wherein FIG. 2A demonstrates receiver-transmitter interference in communication between a hub and two spokes.

FIG. 2A schematically illustrates an exemplary RF communication system comprising a hub terminal 3 which communicates with two spoke terminals 1 and 2 via antennas 3w and 3e. In this example there are four desired communicated signals ($s_{13}$, $s_{31}$, $s_{23}$ and $s_{32}$) and four interfering signals ($i_{23}$, $i_{32}$, $i_{31}$ and $i_{13}$). For example, $s_{23}$ denotes the desired signal transmitted from terminal 2 to terminal 3, and $i_{23}$ denotes an interfering signal induced in the signal received in antenna 3e of terminal 3 due to the transmission of $s_{23}$ from terminal 2.

The existence of an interfering signal means that the interference level received by the receiver exceeds the required SIR threshold of the receiver in such way that with other existing error contributors (e.g., phase noise, linearity noise) the quality of the communication will be significantly affected. This is indeed the case when either the interferer transmitting antenna, or the interfered receiving antenna, steers its boresight to the peer terminal, which is the usual scenario in the hub and spokes topology.

In addition, since the architecture exemplified herein is of the hub and spokes type, it is advantageous for carrying it out that all spokes be synchronized to the hub. For example, the spoke may be synchronized to the timing, frequency and received power at the hub receiver input. Optionally, the local oscillators (not shown) in the hub are synchronized, the hub transceivers (not shown) operate at the same frequency and employ the same sampling clock, and the transceivers in the spokes are synchronized as slaves to the timing clock and frequency of the hub operating as master. The hub may employ a power control scheme for the spokes transmitters that maintain the same receiving level in the hub for all the spoke transmitters. It is further assumed in some of the embodiments that the signal to interferer ratio is sufficiently high to achieve signal acquisition prior to activation of the interference cancellation scheme of the present invention. A special 'system on' procedure may be implemented to ensure that all links startup separately without interferers.

Figure 2B:
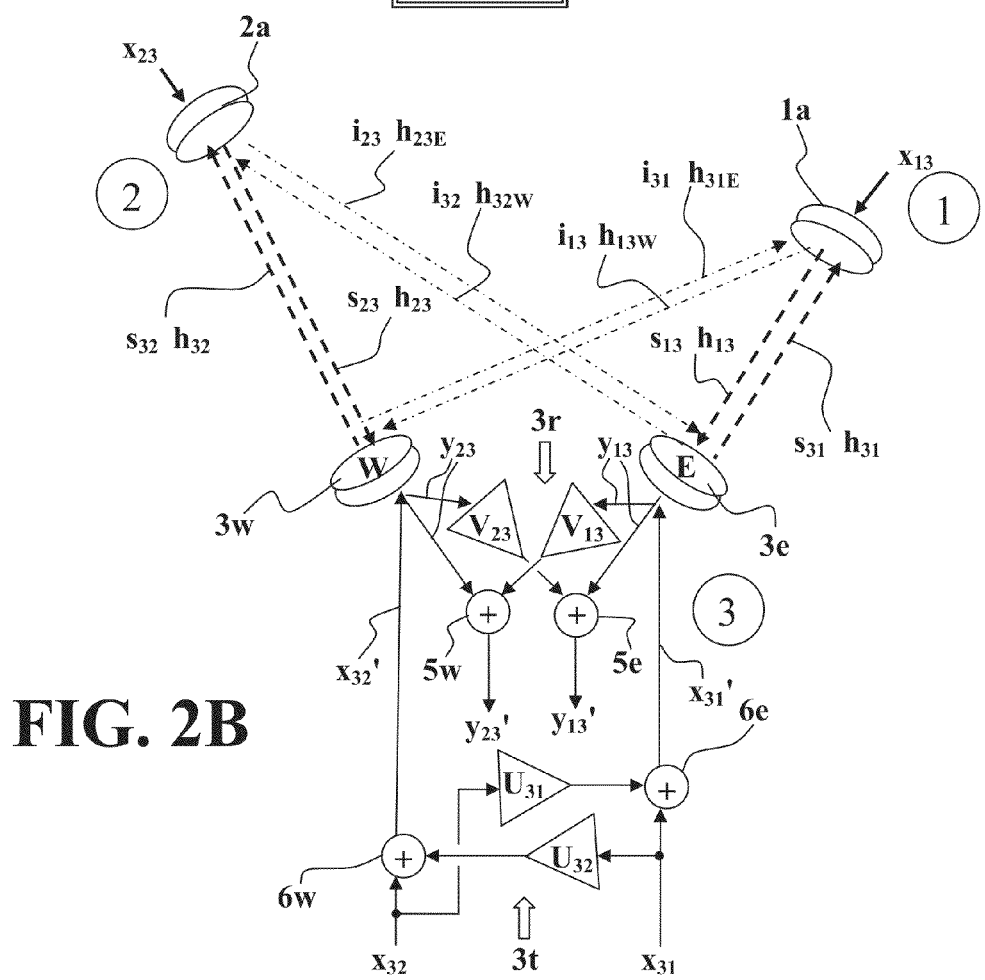

FIG. 2B exemplifies an embodiment of the present invention using receiver and transmitter interference cancellation loops for canceling interfering signals introduced at both directions of the PTP links demonstrated in FIG. 2A. In this two spoke-and-hub terminals example a dual 2×2 beam-former matrix is employed for canceling the interfering signals $i_{13}$, $i_{23}$, $i_{31}$ and $i_{32}$. The beam-former matrix is comprised of $V_{13}$ & $V_{23}$ beam formers at the receiving path 3r, and $U_{13}$ & $U_{23}$ beam formers at the transmitting path 3t, of hub 3.

The beam formers may be implemented in baseband, for example, by digital signal processing hardware. In order to overcome the dispersion of the channel, an ODFM modulation (not shown) may be incorporated, which enables to separate the broadband signal carrier into a group of narrow band sub-carriers such that the beam-former matrix coefficients of each subcarrier can be provided in form of a simple complex scalar value.

The hub antennas 3e and 3w, respectively, are directed to spoke antennas 1a and 2a, referred to hereinafter as 'east' and 'west' antennas for convenience. It is noted that for the N transceiver/antenna case the U and V beam former matrices becomes of dimension N×N.

As seen in FIG. 2B, in this example there are four desired signals and four interfering signals, as follows—

Desired signals:

$s_{23}=x_{23}*h_{23}$ transmitting signal $x_{23}$ from antenna 2a to antenna 3w;

$s_{13}=x_{13}*h_{13}$ transmitting signal $x_{13}$ from antenna 1a to antenna 3e;

$s_{32}=x_{32}*h_{32}$ transmitting signal $x_{32}$ from antenna 3w to antenna 2a; and $s_{31}=x_{31}*h_{31}$ transmitting signal $x_{31}$ from antenna 3e to antenna 1a, and interferer signals:

$i_{23}=x_{23}*h_{23E}$ transmitted from antenna 2a to antenna 3e;

$i_{13}=x_{13}*h_{13W}$ transmitted from antenna 1a to antenna 3w;

$i_{32}=x_{32}*h_{32W}$ transmitted from antenna 3e to antenna 2a; and $i_{31}=x_{31}*h_{31E}$ transmitted from antenna 3w to antenna 1a;

wherein ($h_{23}$, $h_{13}$, $h_{32}$ and $h_{13}$) and ($h_{23E}$, $h_{13W}$, $h_{32W}$ and $h_{31E}$) denote the channels between spoke and hub antennas.

In an exemplary embodiment of the invention, all four interferers may be cancelled at hub terminal 3, but there may be events of cancellation of only one, two, or three, of the interferers as well.

Interfering signals $i_{13}$ and $i_{23}$ are cancelled by summating at 5w and 5e, in the receiving path 3r, the signals $y_{23}$ and $y_{13}$ received from antennas 3w and 3e, respectively, with the signals produced by beam-formers $V_{23}$ and $V_{13}$. The signals $y_{23}'$ and $y_{13}'$ obtained from the summations at 5w and 5e provide estimation of transmitted signals, $s_{23}$ and $s_{13}$ respectively, without the interfering signals $i_{13}$ and $i_{23}$.

In the transmitting path 3t, the signals $x_{32}$ and $x_{31}$ are summated at 6w and 6e with the signals generated by beam-formers $U_{32}$ and $U_{31}$. The signals $x_{32}'$ and $x_{31}'$ obtained from the signals summations at 6w and 6e, provide estimation of signals $s_{32}$ and $s_{31}$ that should be transmitted in order to null interferences $i_{32}$ and $i_{31}$ received in antennas 2a and 1a, respectively.

In exemplary embodiments of the present invention beam-formers terms are determined by computing the cross correlation between the interfering signal and the interfered signal, which is then used as a measure for the terms determination. The beamformer terms may be computed using least means square (LMS) algorithm, or other estimation methods as known in the art, such as, but not limited to, DMI (direct covariance matrix inversion), RLS (Root Least Square), or any known MSE (Minimum Square Error) method.

In some embodiments of the present invention, in a hub having N antennas, the interference cancellation at the receiving side of the hub is achieved utilizing an N order baseband beam-former matrix for each receiver at the hub. Similarly, an N order baseband transmitting beam former may be incorporated in the hub in order to cancel the interference of each spoke receiver (as nulls in Rx equivalent to null in Tx).

Figure 2C:
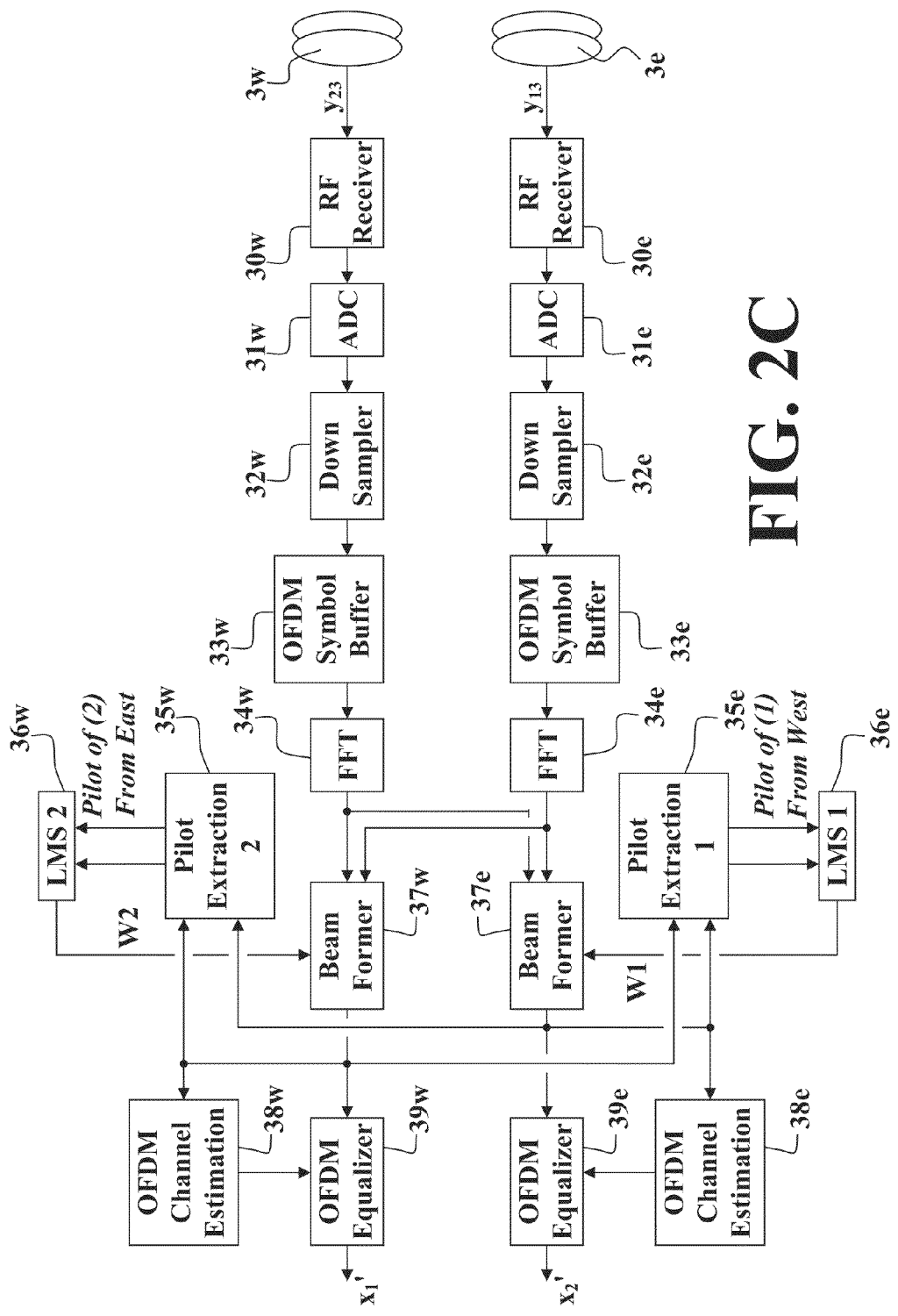

The block diagram shown in FIG. 2C schematically illustrates a possible interference cancellation implementation in an exemplary embodiment using OFDM or OFDMA system, which may be used in the receiving path 3r of hub terminal 3, for example, based on estimations of the beam-former terms. In this example two OFDM receivers 30e and 30w are respectively used to receive signals from the east and west antennas, 3e and 3w, of hub 3. In possible embodiments receivers 30e and 30w may be implemented without automatic gain control (AGC) timing frequency and recovery, since it is assumed that the spokes transmitters adjust themselves through a special dedicated hub-spoke loop (not shown).

The signals from receivers 30e and 30w are digitized in ADC blocks 31e and 31w, respectively, and then converted into baseband signals by down converter blocks 32e and 32w. The received OFDM symbols are then respectively stored in buffers 33e and 33w, and FFT transformed in blocks 34e and 34w. Each path employs a respective beam former, 37e and 37w that cancel interferences introduced due to the signal transmitted in the other path. These interferences are regarded as interferers to the receivers that do not belong to their link.

The weights W1 and W2 used by beam formers 37e and 37w respectively are set at each receiver path by respective LMS loop controllers 36e and 36w. LMS loop controllers 36e and 36w may be active only on the signal pilots/sample symbols after executing a dedicated pilot/data symbol extraction from the composite signal in blocks 35e and 35w, respectively. After cleaning the desired signal from the interference in the beam formers 37e and 37w, the estimated new signals are input to OFDM equalizers 39e and 39w, which are usually part of the original OFDM receiver. The OFDM equalizer coefficients may be set by respective channel estimators 38e and 38w, which may also operate on interference free desired samples.

In another possible embodiment of the present invention the channel estimators and the LMS controllers of all hub receivers are unified to one module (not shown). Similarly, in other possible embodiments of the present invention, the beam formers and channel equalizers of all the hub receivers may be also be unified.

Figure 4E:
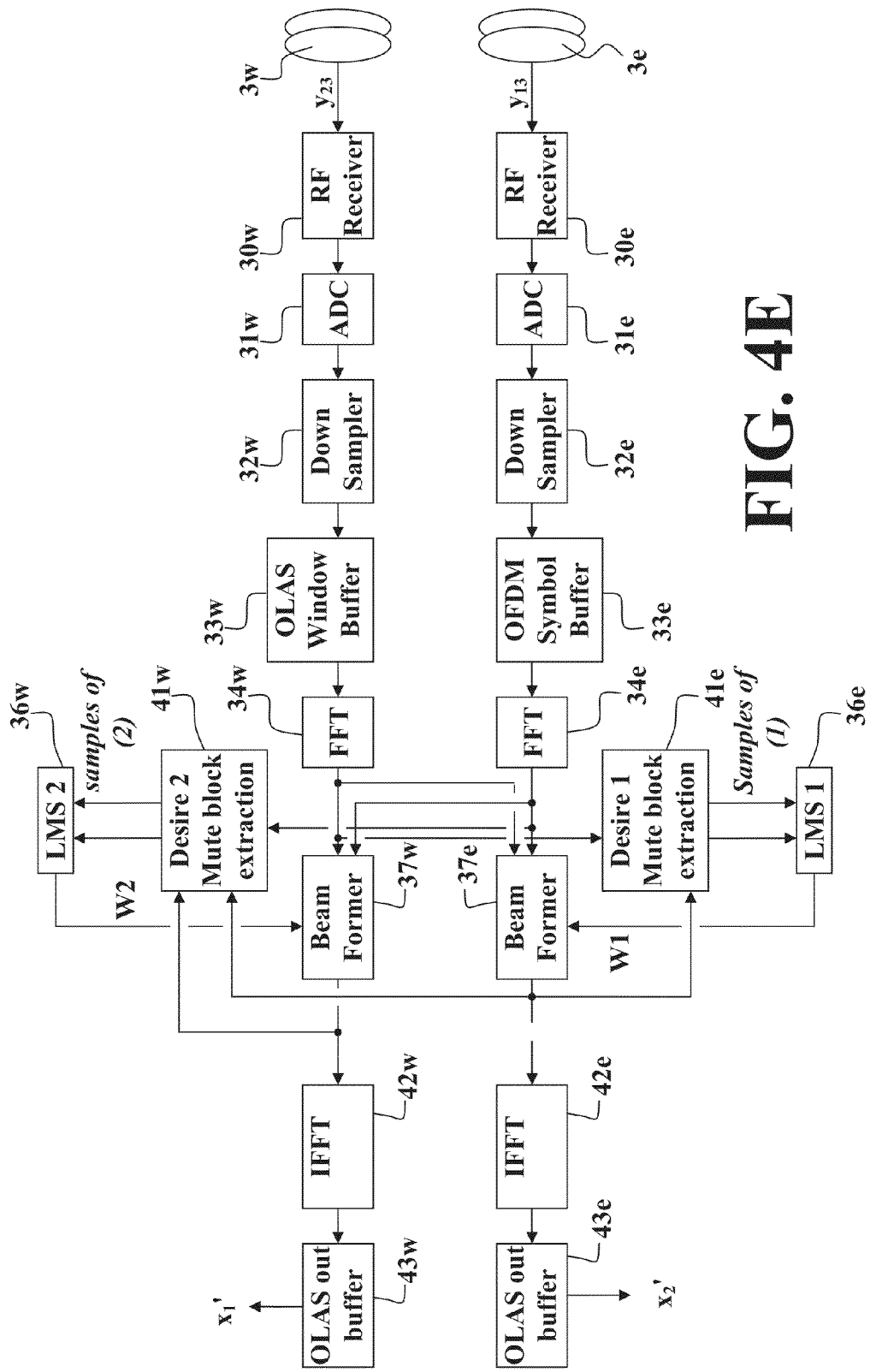

The block diagram shown in FIG. 4E schematically illustrates an exemplary interference cancellation implementation of the present invention, wherein arbitrary broadband signals are used, such as, but not limited to, UMTS/HSPA/WiMAX/LTE. In this exemplary embodiment the system is agnostic to the data signal. It is however required to execute the LMS calculations 36e and 36w during mutes in the pertinent desire signals.

The received signals $y_{13}$ and $y_{23}$ after the down-sampling at 32w and 32e are buffered in the OLAS buffers 33w and 33e, thereafter transformed to frequency domain by FFT blocks 34e and 34w, beam formers 37e and 37w cancel the mutual interference. The weights from the beam formers 37e and 37w are calculated by LMS 1-36e and LMS 2-36w respectively. These weights are calculated during mute period that is conducted separately on desired signal 1 and desired signal 2. When LMS2-36w is active, only desired signal 1 is received at both antennas. LMS2-36w correlate the received signal that originates from the signal received in antenna 3e (y13), and the error signal which is the output of beam-former 37w. The Desired 2 mute block extraction 41w buffer the 2 frequency domain vectors produced by beam formers 37e and 37w, during mute period FFT block 34e outputs and also beam former 37w. The OLAS out buffers 43w and 43e output the estimated interference free signals x1' and x2'.

In another embodiment of the present invention pilots will not be needed if in certain periods, instead of transmitting pilot symbol known to the receiver, the desired transmitter spoke will be muted while the other transmitters transmit conventional data. With reference to FIG. 2B, it is assumed that in certain periods there is no signal transmission from the transmitter of terminal 1, and in other certain periods there is no transmission from the transmitter of terminal 2 (i.e., $x_{13}$ or $x_{23}$ are muted). The pilot extractors in FIG. 2C 35e and 35w may be thus used to collect the data during the mute periods. The weights will be calculated from this data as if they where pilots. In N spokes implementations this scheme may be carried out by muting a single spoke transmitter at a time in round robin fashion.

Two possible embodiments will be now described for calculating the weights at the transmitting path 3t of hub terminal 3, one relating to a possible TDD implementation and the other to a possible FDD implementation.

I—Using LMS in the Spoke Receiver to Set Weights in the Transmitter

Figure 2D:
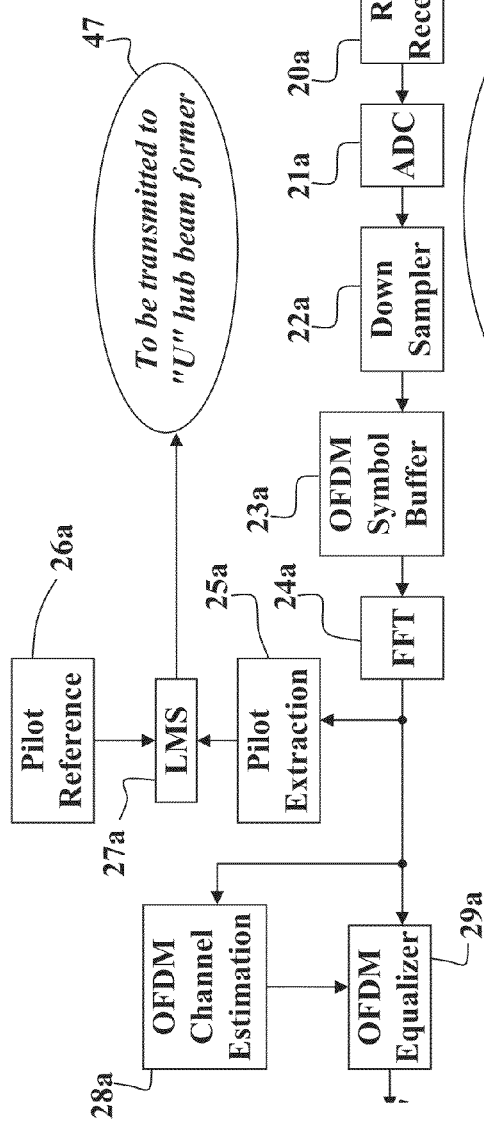

In this embodiment the LMS weight calculation is carried out at the one or more spokes receivers and the weights computed for suppressing the interference are sent back to the hub transmitter through the air over a special return channel. This embodiment is suitable, for example, for FDD where the reciprocity of the channel state in the uplink (UL) direction (from spoke to hub) and in the downlink (DL) direction (from hub to spoke) cannot be assumed. It is noted that due to the cancellation loop through the link the dynamics of the loop is expected to be significantly affected (since the weights are transmitted through the air the update rate is lowered). The block diagram shown in FIG. 2D schematically illustrates LMS calculation on the interfering signal in the spoke. In this example the LMS weights are estimated in the LMS block 27a by sampling the interfering signal received as residual signal (as the lobes are overlapping) from the interfering transmitter.

For example, in spoke terminal 1 the signal $y_{31}$ from antenna 3e is received through antenna 1a by receiver 20a, digitized in block 21a, and converted into a baseband signal by down converter 22a. The received OFDM symbol is stored in buffer 23a and FFT transformed in block 24a. Weight calculations are carried out by LMS block 27a based on the known received training pilots, or on the fact that pure noise signal was received when the desired signal was muted as provided in the pilot reference from block 26a, and the pilot extracted in block 25a from FFT transformed symbols. Concurrently, the FFT transformed signal is input to OFDM equalizers 29a, which coefficients may be set by channel estimator 28a, for producing the desired signal $y_{31}'$.

As in the hub case, the LMS scheme is carried out in LMS block 27a on a synchronized OFDM symbol as part of the OFDM receiver at the spoke. The weights of all subcarriers should be sent at 47 to the hub terminal 3 through the air and used therein to update the terms of beamformer $U_{32}$. In some possible embodiments of the present invention the transmitting of the weights of all subcarriers at 47 may impose a heavy burden that may impact the network capacity that supposed to be improved by the interference cancellation. This heavy burden may be alleviated by transmitting a reduced number of weights after activating significant decimation. This decimation assumes existence of some oversampling in frequency domain over the differential delay spread.

Figure 2E:
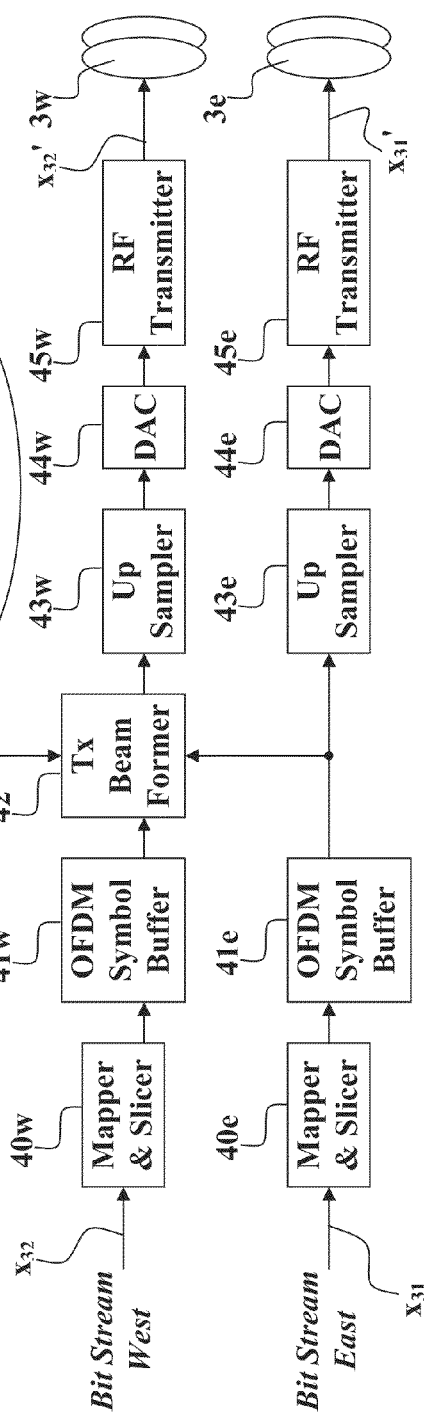

With reference to FIG. 2E, exemplifying possible embodiment of the present invention of transmitting path 3t at hub 3, wherein bit streams, $x_{31}$ and $x_{32}$, are modified in beam former 42 based on the weights received at 48 (sent from the spoke at 47 in FIG. 2D). In this example the bit streams $x_{31}$ and $x_{32}$ are converted into symbols at 40e and 40w, and respectively stored in buffers 41e and 41w. Before transmitting the adjusted signals $x_{31}'$ and $x_{32}'$ through hub antennas 2e and 2s, by transmitters 45e and 45w respectively, the digital signals are sampled at 43e and 43w and converted into analog signal at 44e and 44w.

It should be noted that as opposed to the hub receiver, the spoke receiver does employ full synchronization of timing and frequency that is slaved to the hub. It is assumed that the spoke transmitter is fully synchronized to the spoke receiver in time and frequency, and hence, it is also synchronized to the hub transmitter and receiver.

II—Transmitter Weights are Calculated from Receiver Weights

In TDD, where inherent reciprocity (i.e., same channel can be used in both directions) between the channel state in UL and DL can be assumed, there is an option to calculate the transmitter weights U from the calculated receiver weights V. The only part that is not reciprocal is the transmitter and receiver frequency response. For example $h_{23}$ (see FIG. 2B) can be expressed as:

$$h_{23} = t_2 \cdot h_{23}' \cdot r_3$$

and $$h_{32} = t_3 \cdot h_{32}' \cdot r_2$$

where $t_2$ and $t_3$ express the response of the transmitters, $r_2$ and $r_3$ express the response of the receivers, and $h_{23}'$ and $h_{32}'$ respectively denotes the channel state from spoke terminal 2 to hub terminal 3 and from hub terminal 3 to spoke terminal 2. In case of TDD it can be assumed that $h_{23}' = h_{32}'$.

In this example the LMS at the receiving path 3r calculates the V coefficients and out of them the U coefficient can be calculated.

For example $V_{23}$ may be calculated from $U_{32}$: $U_{23} = f_{23} \cdot V_{32}$.

The correction ratio $f_{23}$ is proportional to the ratio of $t_2 r_3 / t_3 r_2$ that can be extracted by certain calibration procedure among the transceivers and antennas in the hub side only.

By way of example, for the two antennas hub case, if the received signal to interference ratio (SIR), without employing the interferences cancellation scheme of the present invention in some embodiments thereof, is A dB in one of the receivers, maximum degradation of $20*\log(1-10^{-A/20})$ is expected due to leaked interferences. Thus, for SIR of 10 dB the maximal expected degradation due to leaked interferences is expected to be about 3.3 dB. It is noted that by employing the interferences cancellation scheme of the present invention, in some embodiments thereof, the SIR is expected to be improved by 20-30 dB. In wireless communication networks in which the thermal noise is not a significant factor on the whole performance due to low link loss or high transmitting power, this degradation in the desired signal will not affect significantly the composite value of the signal to noise and interference ratio (SINR). In these types of networks, which usually work in lower (e.g., below 6 GHz) frequencies, the interference is the main problem that hampers performance and actually determines the link SINR.

Interference Cancellation with MIMO Antennas

The system described above can be extended to links employing multiple input multiple output (MIMO) implementations, wherein each transceiver may employ two or more antennas each having a different number of data transmission streams. For example, in case of hub with L sectors, wherein each sector may receive signals by N antennas, and a remote terminal transmitting with M antennas, wherein each receiving antenna is interfered by L*M signals from antennas of the other remote terminals that are served by the other sectors. In order to cancel the interference in each receiving antenna M injectors may be needed to weigh the received signal from the M antennas of the neighbor sectors, in order to cancel the pertinent leakage from neighboring remote terminal. For this purpose a pilot from each transmitting antenna, that is not interfered by transmission from the other antennas, may be needed, or if concurrent pilots are transmitted, with orthogonal sequence that enables separation.

FIG. 6A schematically illustrates a 2×2 MIMO interference cancellation implementation in accordance with an exemplary embodiment of the present invention. In this example, remote terminal (1,2) transmits signals $x_1$ and $x_2$ using antennas 1n and 2n, and remote terminal (3,4) transmits signals $x_3$ and $x_4$ using antennas 3n and 4n. The hub has two antennas for each sector, (1m, 2m) and (3m, 4m), respectively. In the hub, the interference cancellation weights are calculated according to the desired channel state coefficients $h_{33}$, $h_{34}$, $h_{43}$ and $h_{44}$ where the interfering channel state coefficients are $h_{13}$, $h_{14}$, $h_{23}$ and $h_{24}$. The beam former coefficients $u_{13}$, $u_{14}$, $u_{23}$ and $u_{24}$ are adjusted to cancel the interfering signals (of $h_{13}$, $h_{14}$, $h_{23}$ and $h_{24}$).

In one possible embodiment of the present invention, the beam former coefficients are calculated by two LMS circuits (as described hereinabove), each adapted to calculate two weight coefficients. In the downlink the process may be reciprocal and may be carried out in the same manner as was described hereinabove for the SISO case.

The MIMO configuration that was described with reference to FIG. 6A can be implemented employing spatial or polar diversity (spatial diversity means that the antennas differ by certain space between them, polar diversity means that the antennas have orthogonal polarization between each other). The MIMO implementation can be handled using two options, either as transmit diversity or as multiplexing (multiplying data stream). Polar multiplexing works best in line-of-sight (LOS) scenarios, while the spatial multiplexing works best in non-LOS scenarios with high scattering.

The performance of the spatial multiplexing can be dependent on the angle spread arrival of the signal to the hub, and to the remote terminal, the wider the angle spread arrival is the better the MIMO performance achieved. The problem is that with directional antennas at both sides of the link the angle spread is usually bounded and as a result the spatial multiplexing exhibits degraded performance. The present invention in some embodiments thereof may be employed to improve the MIMO multiplexing that exploits the wide angle spread due to high scatterings (e.g., when the scattering causes the signal to arrive to the antenna from several directions that form wide angle of arrival).

Two different techniques in accordance with possible embodiments of the present invention for improving MIMO multiplexing while exploiting the wide angle high scatterings spread will be now described.

Multi-Hop Hub

There are cases when one spoke of a first network is used as hub for another star network. This topology is fully supported by some embodiments of the present invention. One way to eliminate interfering signals by employing embodiments of the present invention is to consider each terminal that steer its antenna boresight toward the other hub as spoke to this hub and vice versa. The interference from terminals in the hub that do not steer their antenna boresight toward the other hub is considered negligible and can be left untreated. As such, the multi-hop hub can be separated into two separate cases of hub and spokes, where the interference cancelling techniques of the present invention described hereinabove may be applied in each such hub and spokes case.

MIMO Cross Lobe Multiplexing (CLOMUX)

Figure 10:
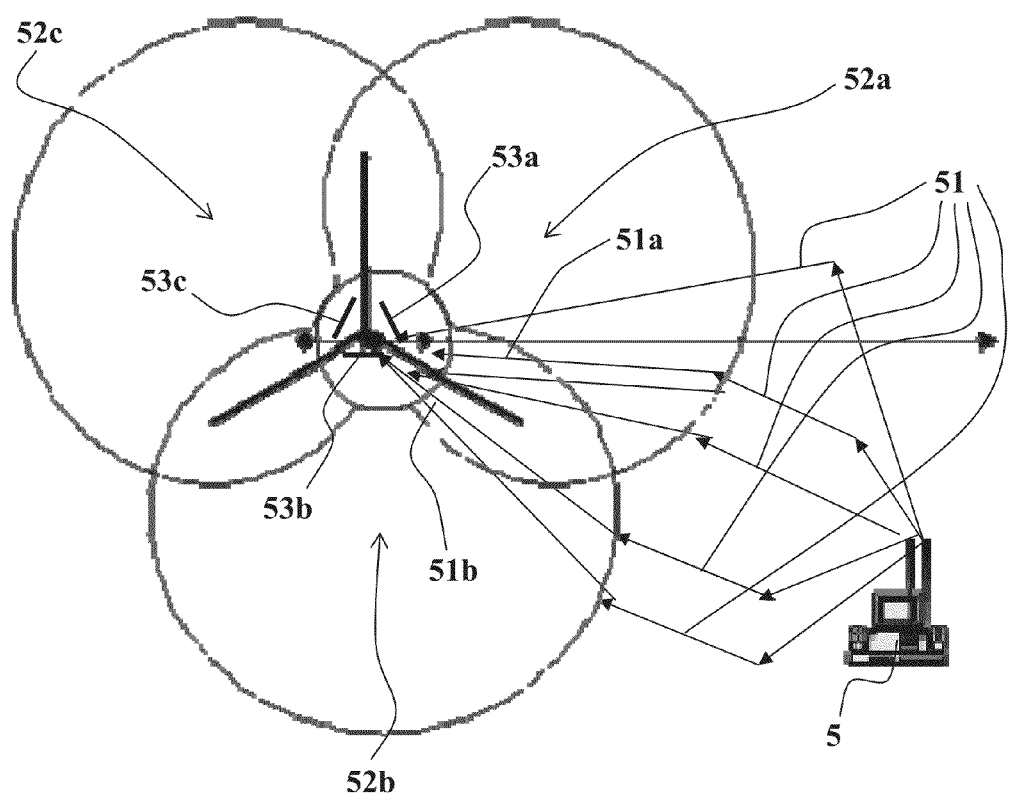
FIG. 10 schematically illustrates MIMO Lobe multiplexing architecture in accordance with some embodiments of the invention.

With reference to FIG. 10, in exemplary embodiments of the invention the remote terminal 5 may be located near the fringe of two sectors 52a and 52b. Remote terminal 5 may have wide angle spread that causes more or less similar power of the scattered signal 51 that propagate in different directions to be received at both lobes of antennas 53a and 53b, respectively. With the topology of some of the embodiments of the present invention it is proposed to use the lobes of sectors 52a and 52b having different boresights as means to exploit the angle spread and to reduce the correlation between the received signals at both antennas 53a and 53b.

It is proposed in such cases to use the antennas 53a and 53b of the two sectors 52a and 52b as dual receiving MIMO antennas that receive two data streams 51a and 51b that are transmitted from remote terminal 5. The remote terminal 5 transmits with spatial antennas in order to exploit the angle spread around its reception area and the hub antennas 53a and 53b exploits the angle spread by receiving the signal with directional antenna with offset boresight angle between them.

Exploiting Angle Spread in the Remote Terminal

In order to improve link budget and to lower inter cell interference it is proposed to use directional antennas at the remote terminals. As discussed hereinabove, the problem with directional antenna is that the MIMO that exploits angle spread is significantly degraded. In order to lower the degradation it is proposed to use switched directional beam antennas, such that in case of LOS and low angle spreads the beam that receives the maximum energy will be selected. In case of wider angle spread several adjacent beams will be selected together in order to receive the most of the scattered energy around the remote terminal.

In order to achieve MIMO gain it is required to lower the correlation of the channel toward the MIMO antennas. One way to lower the correlation of the channel toward the MIMO antennas is by spacing the antennas. Another way, is by incorporating different polarization to the antennas. By utilizing interference cancellation of the present invention it is expected that two adjacent antennas with different bore sight angle will have lower correlation, and as such, improved gains may be achieved in MIMO-multiplexing implementations.

The LMS Control

LMS is a low complex solution that converges to theoretical Wiener-Hopf equation that estimates weights exhibiting minimal square error. According to some embodiments of the present invention an LMS controller is used to set the weights of the receiver and the transmitter beam-formers in the hub. FIG. 4A is a block diagram schematically illustrating an implementation of the LMS controller module 60 used for setting beam formers weights in possible embodiments of the present invention. The LMS controller 60 may be active only on the received pilots of the currently received OFDM symbol By way of example, the cancellation of interfering signal $i_{13E}$ will be described to exemplify the operation of the LMS controller module 60. As shown in FIG. 3A, $i_{13E}$ can be cancelled by setting $V_{13}$ to a proper value. For this purpose the signal $y_{23}$, which is comprised of the desired signal $s_{23}$ and of the interference signal $i_{13E}$, is analyzed in frequency domain after FFT is applied. The LMS controller 60 receives as input the tones that carry the known pilots of interfering signal $i_{13E}$, as produced by the pilot extraction block (e.g., 25a in FIG. 2D). The LMS can be done with the unknown signal symbols if they are free of desired signal (if it was muted).

It is noted that in some cases there will be no colliding tones (i.e., like muting, such that when there are pilots in one antenna no sub-carrier is used in the other antenna) with the other existing signal $s_{23}$ in $y_{23}$, and in other possible cases such collisions may occur, but which can be compensated due to using a pre-orthogonality scheme at the transmitter over certain time interval. Therefore, any residual of pilots of $i_{13E}$ may optionally be regarded as an error which should be cancelled by the LMS circuit by exploiting the pre-knowledge of the content of the pilots of $i_{13E}$.

$Pi_{13E}(k)$ is the content of the pilot tone k of the OFDM symbol of interfering signal in the frequency domain, $Ps_{23}(k)$ is the content of the pilot tone of the desired signal (that is either zero or orthogonal to $Pi_{13E}(k)$), and $Py_{23}(k)$ is the pilot tone of the received OFDM signal that is comprised of $Ps_{23}(k)$ and $Pi_{13E}(k)$. The LMS module 60 sets the pertinent weight $w_{23}(k)$ of pilot k of the OFDM symbol to achieve minimum square error power of the component $Pi_{13E}(k)$ over certain time interval.

While $Pi_{13E}(k)$ is generally known from $Py_{13}(k)$, the correlation can be carried out with the known pilot or with the measured signal samples in case there was mute (i.e., the desired signal $Pi_{23W}(k)=0$). In that case $Pi_{13E}(k)$ can be an actual data and not a known special pilot signal.

In an exemplary embodiment of the invention, the weight $w_{23}(k)$ is computed, for example, by multiplying at 66 the conjugate of $Pi_{13E}(k)$, as obtained from block 67, by the previously obtained output signal $Py_{23E}'(k)$, scaling at 65 the obtained multiplication result by a preset scaling parameter p, and adding at 64 the scaled result to the previously calculated weight result stored in buffer 63. The calculated weight $w_{23}(k)$ is then used as a setting parameter for the beamformer 61. In this example, beamformer 61 adjusts the signal $Py_{13}(k)$ responsible for interference $i_{13}$. The adjusted signal $Py_{13}(k)$ and received signal $Py_{23}(k)$ are then summated at 62 to provide the estimation $Py_{23}'(k)$ of the received signal $Py_{23}(k)$.

In case the LMS module 60 calculates the coefficients of only decimated tones that carry pilots in order to calculate the beam former coefficients of the full tone, it will be necessary to incorporate frequency domain interpolator in order to recover the weights for the non-pilot tones (the value of weights that are calculated at dedicate decimated sub-carrier as pilots should be interpolated for data sub carriers between the pilots).

In another exemplary embodiment of the present invention the OFDM provide a full pilot symbol every N data symbols. In this case the LMS module 60 may be active only during this pilot symbol and will operate on all the tones.

Still referring to FIG. 4A, scaling value p in block 65 sets the amount of averaging in the cross correlation process in order to lower the impact of the AWGN from the correlation result. Together with the required error signal that needs to be rejected, there is also present a strong uncorrelated desired signal component that its impact on the LMS weight should be low enough in order to avoid hampering the error rejection performance. Setting low value of μ may be used to decrease the impact of uncorrelated components of the desired signal on the value of the LMS weights. On the other hand, this value may impact significantly the dynamics performance of the LMS loop. In an exemplary embodiment of the invention, a tradeoff is maintained between weight noise and dynamics.

Although the beam former is of order N in this embodiment there are complex weights at N−1 brunches of the beam former with the brunch that is attached to the desired signal left of constant value (practically a shortcut without a multiplier) on the real and the imaginary part. This particular weight in the main brunch may be omitted due to the fact that there are not enough degrees of freedom to set the weights to optimal desired response, as was explained above. It is obvious that the desired signal that exists at both east and west antennas can face undesired subtraction that will cause degradation. However, since it is assumed that the antennas are directional with bounded overlap, it is expected that this degradation will be low.

Extension to Multiple Spokes

A common case of multiple spokes should be indicated when interference from one transmitter can be received by more than two receivers. These phenomena can impose high correlation among the spatial weights. It can be seen in analysis that with the higher correlation among the weights the Eigen spread of the covariance matrix of the Weiner-Hopf solution also grows. In this case, also known as 'weight leakage', there may be a need for dedicated weight constrain through their spatial dimension to enhance the convergence in the LMS weight.

In possible embodiments of the present invention the interference cancellation is performed in frequency domain utilizing a beam former and an adaptive filter configured to generate beam former weights. In case the signal is of OFDM/OFDMA type the adaptive filter and the beam former used can exploit the original OFDM signal for performing the cancellation, and thus the cancellation loop should be synchronized to the OFDM signal. The interference cancellation will be then performed directly on the original OFDM subcarriers in frequency domain.

In general, the embodiments of the present invention can be implemented using existing hardware or hardware that could be readily designed and created by those of ordinary skill in the art. Thus, the architecture of exemplary embodiments has not always been explained in detail, except to note that some implementations may generally have a processor and memory (of some kind). The processor can be a microprocessor, an application specific integrated circuit (ASIC), or a computing device configured to fetch and execute instructions. It is noted that the various beamformers, weight calculation units, estimating units, signal summation and multiplication units, ADC and DAC units, equalizer units, channel estimators, pilot extractors, digital modulators and demodulators, FFT and IFFT units, filters, and other digital signal processing units, shown in the FIGs. may be implemented by hardware (e.g., IC, SoC, ASIC, FPGA, and the like), or as software modules (e.g., machine binary code, C++, and the like), or by combinations thereof.

Potential Applications

As was discussed hereinabove numerous applications may be considered with the interference cancellation techniques of the present invention, some of which are discussed below.

Continuous Radar

Continuous radars like FM-CW radar transmit and receive simultaneously. Embodiments of the present invention enable reducing the antenna separation requirement of such RADAR, hence easing the deployment of such RADAR specifically on moving vehicles. In such radar systems two antennas are typically used, wherein one antenna is used for transmitting signals and the other for receiving signals. Accordingly, embodiments of the present invention as discussed hereinabove with reference to FIGS. 3-9 and 11 may be used to improve performance and antenna separation. For example, the main interference cancellation loop may be used to suppress reception interference in the Radar receiving antenna caused by signals transmitted from its transmitting antenna.

Hexa Loop Processing

Figure 13:
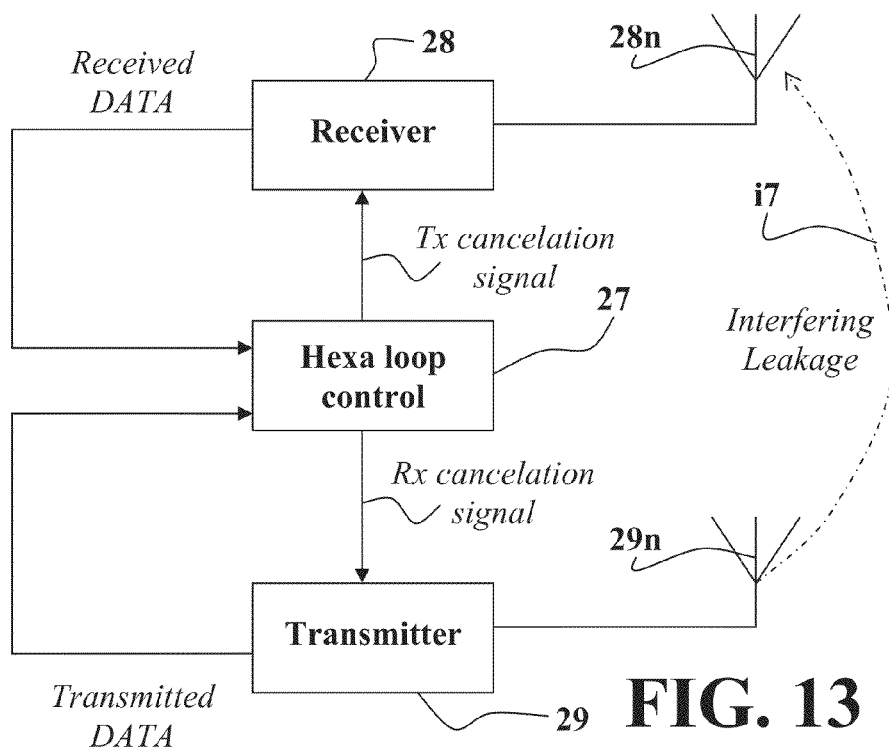
FIG. 13 is a block diagram schematically illustrating employing Hexa loop control for interference cancellation in accordance with some embodiments of the invention.

FIG. 13 exemplifies hexa loop processing (i.e., utilizing six cancellation loops as described hereinabove) according to one embodiment of the present invention. The Hexa loop control 27 may be configured to carry out any combination of the loops described hereinabove, optionally all the loops are employed comprising the primary loop, the secondary loop, the power control loop, outband noise loop, antenna beam former loop, and beam selection loop. In this way the leakage i7 introduced in the reception in antenna 28*n* by signals transmitted from antenna 29*n* may be significantly reduced by implementing the interference cancellation loops in receiver 28 and in transmitter 29, as described above.

Wireless Multi Point-to-Point (PMP) Star Network

This network is of a star form of FDD/TDD multi point-to-point link that works concurrently and distributes payload traffic from one central point to several points of presence. Implementations of interference cancellation techniques of the present invention in PMP star networks was discussed in detail hereinabove (in the hub and spokes topology).

Wireless Multi MIMO Point-to-Point (PMP) Star Network

There are common applications where each PTP link is comprised from several links with spatial/polar multiplexing or transmit/receive diversity. For example, two separate links that interfere with each other may be connected to one hub. Assuming the first link has H1 antennas at the hub and S1 antennas at the spoke, and that the second link has H2 antennas at the hub and S2 antennas at the spokes. In this case each receiving antenna of the first link at the hub will receive S2 interferers that will require S2 order beam former with S2-1 weights, where each weight is set by totally independent S2-1 LMS controllers. Together, for the entire H1 antennas there will be needed H1(S2-1) LMS controllers that set H1(S2-1) beam former weights. In the same sense, at the hub, the number of transmitter weights for the second link will be the same as the number of receiver weights for the first link that were discussed above.

Wireless Mesh Network

As wireless mesh networks employ multi-transceiver nodes, the frequency reuse reduction (up to reuse one) can be supported when employing the above described cancellation techniques of some embodiments of the present invention.

Wireless Point-to-Multipoint (PMP) Star Network

PMP network topology is usually configured as one hub point and multi-point access sources. These types of networks employ multi-access techniques like TDMA, CDMA ALOHA to improve the frequency reuse. The interference cancellation scheme of some embodiments of the present invention may be used to add another dimension to the network, in order to improve the frequency reuse. Usually the hub of such networks is divided into several sectors in a way that each sector has its own transceiver and antenna. Employing interference cancellation techniques of the present invention enables neighboring sectors to operate at the same frequency channel, which reduces significantly the total frequency reuse merit of the network.

In case of point to multipoint communication, each sector serves several remote terminals, each sharing a different time allocation, frequency allocation, code allocation or combination of all three whether the multiple access technique is one of the mentioned above.

When multiple remote terminals are served by each sector it is recommended to involve the scheduler within the Media Access Controller (MAC) to allocate different frequency resources, time resources or code resources for those remote terminals that are served each by different sectors but are located in close proximity to each other and to the fringe of the covering area between the sectors. Without this allocation policy, if two remote terminals will be allocated to the same radio resource (frequency, time or code) these remote terminals are expected to interfere with each other in both UL and DL.

Employing interference cancellation techniques of the present invention to cancel this interference will steer null toward one remote terminal (the interfering terminal). However, the null width may be too wide to the extent that it may hamper the desired signal gain toward the desired remote terminal transmitter, due to its close proximity to interfering remote terminal. The null width is dependent on the spacing between the sector antennas and the radiation pattern of each antenna. By employing a scheduler that take into account the location of the remote terminals in the process of the resource allocation, the above described degradation of the interference cancellation may be avoided by simply allocating different resources to remote terminals that are both located at the fringe area, such that they will not interfere with each other and thus the interference cancellation may not be necessary. The identification of these remote terminal couple can be done according to the measured channel state of each remote terminal to the transceivers of the hub (channel state is measured by pilots).

Mesh Ad Hoc Network (MANET) Implementation Derivative

MANET has gained wide popularity in the recent years. Mesh network is a network which its elements communicate each other through intermediate peer elements. Usually, the receiving element of these peer elements is a neighbor of its transmitting element. When a network element wants to communicate another network element that does not have a direct communication link to it, it can route its messages to one or several third party network elements that are used as temporary relays in the communication route. The network utilizes dynamic routing capabilities that exploit the existing communication links among the network elements to fulfill intra communication among the network elements.

MANET Examples

WiFi Mesh Networks

The emergence of outdoor WiFi usage usually in city centers has posed requirement to find a solution for backhauling proliferated access points that were deployed in order to cover large outdoor areas. In order to reduce the number of backhaul points of presence, in every group of access point one station is assigned as gateway and is connected directly to the backhauling network. The other stations in the group receive the backhaul data via special wireless mesh network that usually operates in different band than the access network. Usually the access network is in the 2.4 GHz band, where the backhaul mesh network operates in the 5.8 GHz UNII band of frequencies.

Ad-Hoc Mesh Networks

Several application markets require very fast station deployment in already existing mesh networks. The fast deployment requires ultra fast network entry and provisioning process. Such network requirement is very common in the home land security and emergency services market and is referred by skilled in the art as ad-hoc network.

Usually a mesh network utilizes one channel as a management and control channel. This channel is used by all the stations in the network usually in a contention base fashion to allocate bandwidth in the other channels that are dedicated for payload transmission. Ad-hoc network that do not employ the interference cancellation embodiments of the present invention can either transmit or receive but not concurrently. Due to this limitation, a node that is in a transmitting mode is signaling over the control channel that it is busy to receive, and vice versa. A network employing interference cancellation techniques of the present invention will be able to transmit and receive simultaneously, which may improve node capacity by a factor of 2, and the whole network up to twice the number of nodes in the network.

Another potential improvement to a network by employing interference cancellation techniques of the present invention lies in the fact that each station should be in constant listen mode to the control channel before it decides to use the data channel for transmission to neighbor station. When a station finishes transmission in one of the payload channels it should undergone a long muting period that should be devoted for listening to the control channel to learn about the most recent network status that was not known to the station due to long control channel listening absence. A station capable of listening to the control channel while simultaneously transmitting in one of the payload channels will not require the above described muting period, thus, the aggregate network throughput will be increased. Such simultaneous transmitting/receiving as described above may be achieved by using interference cancellation techniques of some embodiments of the present invention.

Full Duplex Point to Point Link

PTP links, when operated in full duplex, usually use either a TDD or FDD scheme. By employing one of the embodiments of the present invention one can use PTP link in full duplex manner, where the two links use the same frequency band and time slot. In this way self echo noise may be cancelled by using interference cancelling techniques of the present invention. Such scheme practically doubles the throughput and spectral efficiency of the PTP link.

Sector Reuse in Point to Multipoint Network

Point to multi point networks are usually divided into sectors in order to increase capacity and to increase the base station antenna gain. Since there is an overlap in the sector antenna radiation pattern toward the neighboring sector it is common to use different frequencies in adjacent sectors (referred to as frequency reuse N scheme where N=3, 4, 12, etc.) a fact that decreases the frequency reuse. By employing interference cancellation techniques of the present invention adjacent sectors can be assigned with the same frequency but opposite duplexing. The resulting duplexing assignment will be as follows:

FDD Scheme

If the FDD use $F^A$ and $F^B$ as duplex frequencies for the DL and for the UP respectively of the pertinent channel F.

The first sector uses for the DL $F^A$ and for the UL $F^B$.

The second adjacent sector uses for the DL $F^B$ and for the UL $F^A$.

The third sector uses for the DL $F^A$ and for the UL $F^B$.

And for the next adjacent sectors this duplexing toggle scheme is repeated. TDD scheme If the TDD use $Frame^A$ and $Frame^B$ as duplex sub-frame for the DL and the UP respectively The first sector uses for the DL $Frame^A$ and for the UL $Frame^B$.

The second adjacent sector uses for the DL $Frame^B$ and for the UL $Frame^A$.

The third sector uses for the DL $Frame^A$ and for the UL $Frame^B$.

In this way the spectral efficiency of the network can be improved.

Self Synchronization and Coordination in Heterogeneous Networks

Heterogeneous networks are networks where a mix of Macro-cells, Micro-cells, Pico-cells, Femto-cells and Relay Stations composes a unified radio access network. This concept has gained attention lately in the wireless market.

One of the key elements in heterogeneous network is the automatic synchronization and coordination which is performed using direct communication through the air by all network components. Such networks are also referred to sometime as Self-Organizing Networks (SON).

Another challenge in heterogeneous networks is the coordination required in order to avoid interference between the macro and the Femtocells. Due to the ubiquity of the Femtocells it is impossible to pre-plan their frequency coordination, which should be a dynamic process. In order to fulfill the two tasks of the synchronization and coordination it is proposed to incorporate an additional receiver used for receiving the sync information from the macro base station environment. Such a receiver is referred to sometimes as "RF Sniffer". In order to enable this additional receiver to succeed in receiving the remote sync signal a special process of periodic muting interval can be employed to the collocated transmitter of the Femtocell in order to avoid the mutual interference. During this muting interval the additional receiver or in some cases the original Femtocell receiver that tuned itself to the sync signal frequency should be able to receive and detect the sync signal.

By using interference cancellation techniques of the present invention the muting process may no longer be necessary. The receiver (either the additional or the original) can receive the remote sync signal during the Femtocell transmission without any requirement for mute mechanism. The primary and secondary cancellations loops described hereinabove can be employed to cancel the self interference that will be caused due to the simultaneous transmit/receive process. By employing this simultaneously transmit/receive function there will be no need for the additional process, like muting, that sometimes requires the macro base station involvement and cause increase in the bandwidth overhead.

Multi Wireless Protocol Terminal

The advancements in Wireless Broadband Networks resulted in emergence of user terminals supporting more than a single wireless interface, enabling the user to connect to the wide-area network (WAN), Local Area Network (LAN) and Personal Area Network (PAN). Perhaps the most common implementation today are terminals which support both 3G (WAN) communication and WiFi (LAN) communication. There are several applications wherein using terminal's WAN and LAN interfaces simultaneously is desirable, for instance in cases wherein a terminal is used as a home/office gateway for several LAN connected appliances to the outer Internet (WAN).

In such cases receive/transmit coordination between the LAN and WAN networks cannot be expected, the spectral proximity of the two (for instance WiFi operating in 2.4 GHz and WiMAX operating in 2.5 GHz) can cause interference. Using the interference cancellation techniques of the present invention enables simultaneous usage of the terminal's LAN and WAN interfaces without performance degradation.

Look-Through Jamming

In electronic warfare jamming of targeted signals is frequently used. However in many cases being able to look through for receiving the target transmitter while performing the jamming operation is desired in order to implement smart jamming process with sophisticated power management. The interference cancellation scheme of the present invention enables this feature, as exemplified in FIG. 12.

In order to protect these friendly receivers 21 and 22 interference cancellation functionality, or interference cancellation module, may be added for each receiver, each employing interference cancellation embodiments of the present invention.

Figure 12:
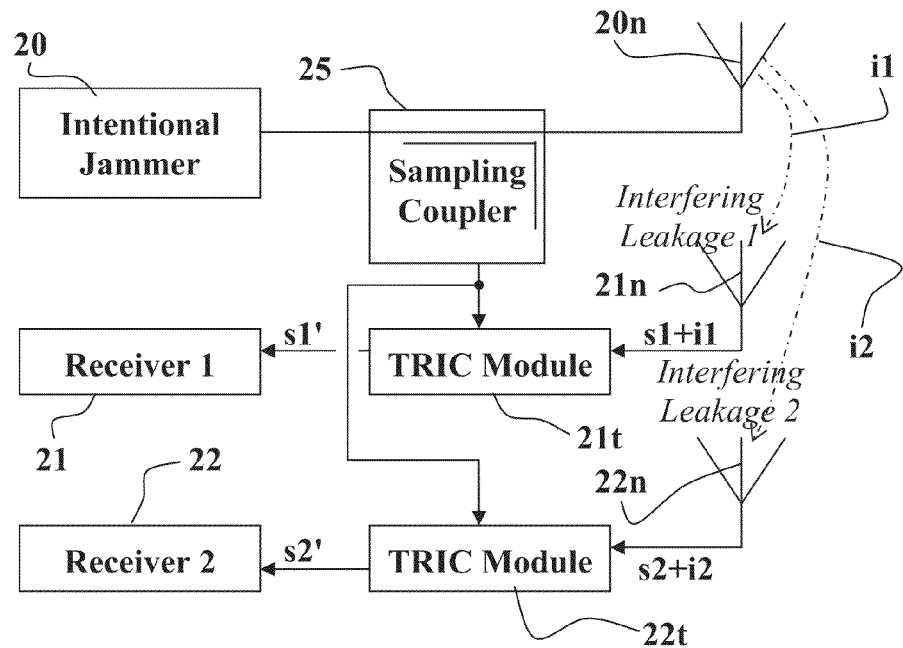
FIG. 12 is a block diagram schematically illustrating jammer interference cancellation in accordance with some embodiments of the invention.

The block diagram shown in FIG. 12 schematically illustrates collocated jammer 20 and two collocated receivers, 21 and 22, which respective antennas, 21n and 22n, receive interfering leakages i1 and i2 induced by signals transmitted from antenna 20n of jammer 20. In this example interference cancellation modules of the present invention, according to some embodiments thereof, 21t and 22t, are used in the receivers paths to cancel the interference leakages using samples of signals acquired by coupler sampling unit 25 from the antenna port of jammer 20, and accordingly adjusting the signal received by their antennas, 21n and 22n, to remove residuals received through leakages i1 and i2. In this way the signals received in antennas 21n and 22n, s1+i1 and s2+i2 respectively, are adjusted by the transmit-receive interference cancellation (TRIC) modules 21t and 22t according to signals sampled by coupler sampling unit 25. The adjusted signals S1' and S2', from which interfering signals were removed, are input to the respective receivers 21 and 22.

The TRIC modules 21t and 22t used in this example are optionally implementations of the primary and/or secondary interference cancellation loops according to any of the exemplary embodiments described hereinabove.

In case of more than one jammer, corresponding sampling coupler units may be used to acquire samples of the signals from the antenna ports of each jammer and provide the acquired samples to the TRIC module of each receiver.

General

It is expected that during the life of a patent maturing from this application many relevant systems and methods be developed and the scope of the terms wireless terminals and networks, and PTP links, is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as optional or advantageous over other embodiments and/or to exclude the incorporation of features from other embodiments.

The word "optionally" is used herein to mean "is provided in some embodiments and not provided in other embodiments". Any particular embodiment of the present invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the optional subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of cancelling interference in a wireless system, said interference introduced by an interfering signal causing reception of an interfered signal responsive to transmission of a desired signal, comprising:
    acquiring said interfering signal from a transmitter during or before transmission thereof in time or frequency domain;
    estimating a reception interference based on al least one previously received interfered signal by utilizing an adaptive filter configured to generate a plurality of coefficients based on at least one previously received interfered signal to which a cancellation signal been injected or summated, where said plurality of coefficients are used for generating the cancellation signal;
    generating an analog cancellation signal based on said acquired interfering signal in time or frequency domain and said reception interference; and
    injecting said analog cancellation signal into an interfered receiver receiving said interfered signal to reduce said interference therefrom.

2. A method according to claim 1, wherein the injecting employs a transmitter, said transmitter being part of a transceiver comprising the interfered receiver.

3. A method according to claim 1, wherein the interfered signal is received by a receiving antenna located adjacent to a transmitting antenna from which the interfering signal is transmitted.

4. A method according to claim 1, wherein the at least one previously received interfered signal comprises at least one previously received interfered signal to which a cancellation signal been injected or summated.

5. A method according to claim 1, further comprising transmitting the interfering signal using a set of antennas configured to steer null or select a beam minimizing interference toward the antenna of the interfered receiver.

6. A method according to claim 1, further comprising receiving the interfered signal using a set of antennas configured to steer null towards the antenna of the interfering transmitter or select a beam minimizing interference from the antenna of the Interfering transmitter.

7. A multiple input multiple output antennas configuration comprising a plurality of interfered receivers each adapted to perform the interference cancelling according to claim 1.

8. A method according to claim 1, used to provide reduced degree of freedom for beamformer weights setting.

9. A method according to claim 1, wherein the adaptive filter is a finite impulse response filter or a frequency domain filter.

10. A method according to claim 1, wherein the estimating comprises frequency domain wide-band acquisition and tracking.

11. A method of cancelling interference introduced in a wireless system into a desired signal transmitted from a primary antenna of a primary transmitter, said interference introduced by an interfering signal transmitted from a secondary antenna of a secondary transmitter, said primary and secondary antennas being adjacently located directional antennas with partially overlapping transmitter antenna patterns, comprising:
    acquiring said interfering signal before or during transmission thereof;
    estimating reception interference based on said acquired interfering signal;
    generating a cancellation signal based on said estimating and said acquired interfering signal; and
    injecting said cancellation signal into said primary transmitter for reducing interference related to said interfering signal at a primary receiver receiving a composite signal comprising said desired signal and said interference.

12. A method according to claim 11, wherein the injecting is into an analog or digital transmission path of the primary transmitter.

13. A method according to claim 11, further comprising a reciprocal cancellation performed for cancelling in the secondary transmitter interference introduced by an interfering signal transmitted from the primary antenna of the primary transmitter.

14. A method according to claim 11, wherein the estimating is carried out in a remote receiver receiving the interfering signal and configured to provide a plurality of coefficients based on at least one previously received interfered signal, further comprising transmitting said coefficients to the primary transmitter for generating the cancellation signal.

15. A method according to claim 11, wherein the primary and secondary transmitters or receivers are respective parts of primary and secondary hub transceivers in a hub and spoke communication network.

16. A method according to claim 11, wherein the estimating comprises frequency domain wide-band acquisition and tracking.

17. A method of cancelling interference introduced in a wireless system into a desired signal transmitted to a primary antenna of a primary receiver, said interference introduced by an interfering signal transmitted to a secondary antenna of a secondary receiver, said primary and secondary antennas being adjacently located directional antennas with partially overlapping receiver antenna patterns, said primary receiver receives a composite signal comprising said desired signal and said interference, the method comprising:
    acquiring said interfering signal as received through said secondary antenna;

estimating reception interference of said interfering signal based on said acquired interfering signal;

generating a cancellation signal based on said estimating and said acquired interfering signal; and summating in said primary receiver said composite signal and said cancellation signal to reduce said interference.

18. A method according to claim 17, further comprising a reciprocal cancellation performed for cancelling in the secondary receiver interference introduced by an interfering signal received by the primary antenna of the primary receiver.

19. A method according to claim 17, wherein the estimating comprises frequency domain wide-band acquisition and tracking.

20. A method of cancelling interference introduced in a wireless system into a desired signal transmitted to a primary antenna of a primary receiver, said interference introduced by an interfering signal transmitted to a secondary antenna of a secondary receiver, said primary and secondary antennas being adjacently located, said primary receiver receives a composite signal comprising said desired signal and said interference, the method comprising:

acquiring said interfering signal as received through said secondary antenna;

estimating reception interference of said interfering signal based on said acquired interfering signal, by temporarily muting the primary transmitter or by transmission of a pre-known interfering signal to the secondary receiver;

generating a cancellation signal based on said estimating and said acquired interfering signal; and summating in said primary receiver said composite signal and said cancellation signal to reduce said interference.

21. A system according to claim 20 comprised of a plurality transceivers using directional antennas with mutual partial overlapping radiation pattern antennas arranged as hub and spoke topology for backhaul application, each transceiver comprising a cross-lobe cancellation mechanism fed by overlapping transceivers.

22. A method of cancelling interference in a wireless system, said interference introduced by an interfering signal causing reception of an interfered signal responsive to transmission of a desired signal, comprising:

acquiring said interfering signal from a transmitter during or before transmission thereof in time or frequency domain;

generating an analog cancellation signal based on said acquired interfering signal in time or frequency domain;

injecting said analog cancellation signal into an interfered receiver receiving said interfered signal to reduce said interference therefrom; and adjusting power of a transmitter from which the interfering signal is transmitted to a maximal value causing limited interference or degradation in the receiver if after the result of the injecting or summating residual error in the obtained signal is still high.

* * * * *